United States Patent [19]

Dick et al.

[11] Patent Number: 5,068,507
[45] Date of Patent: Nov. 26, 1991

[54] ELECTROSLAG SURFACING

[75] Inventors: Ian R. Dick, Linden Park; Ian D. Henderson, Glen Osmond; Gordon L. Kimpton, Glenalta; David S. Wyatt, Woronora, all of Australia

[73] Assignees: Commonwealth Sceentific and Industrial Research Organisation, Campbell; Vida-Weld Pty. Limited, Caringbah, both of Australia

[21] Appl. No.: 649,371

[22] Filed: Jan. 31, 1991

Related U.S. Application Data

[63] Continuation of Ser. No. 478,008, filed as PCT/AU88/00465, Dec. 3, 1987, abandoned.

[30] Foreign Application Priority Data

Dec. 3, 1987 [AU] Australia ............................. PI5724

[51] Int. Cl.$^5$ ............................................. B23K 25/00
[52] U.S. Cl. ................................ 219/73.11; 219/76.1
[58] Field of Search .................. 219/73.1, 73.11, 76.14, 219/76.1, 130.4

[56] References Cited

U.S. PATENT DOCUMENTS

| | | | |
|---|---|---|---|
| 3,254,197 | 5/1966 | Anderson | 219/130.4 |
| 3,361,562 | 1/1968 | Ulrich et al. | |
| 3,922,519 | 11/1975 | Miyano et al. | 219/73.11 |
| 4,309,587 | 1/1982 | Nakano et al. | 219/73.11 |

FOREIGN PATENT DOCUMENTS

| | | |
|---|---|---|
| 990804 | 6/1976 | Canada . |
| 1101653 | 3/1961 | Fed. Rep. of Germany . |
| 2179636 | 11/1973 | France . |
| 2194524 | 3/1974 | France . |
| 927914 | 6/1963 | United Kingdom . |

*Primary Examiner*—Clifford C. Shaw
*Attorney, Agent, or Firm*—Merchant, Gould, Smith, Edell, Welter & Schmidt

[57] ABSTRACT

A method and apparatus for electroslag surfacing of metal plate which utilizes a plate feeder assembly to which the plate is presented and which includes an elongate, horizontally disposed feeder table having an approach-end section and a runout-end section. The plate, with a major surface uppermost, is conveyed along the feeder table in a feeding direction from said approach-end section to said runout-end section, and is subjected to an electroslag operation at a surfacing installation located intermediate those sections to provide a cladding metal layer on that surface. At the surfacing installation, there is a flux mould arrangement under an electrode holder and feeder assembly having depending electrodes vertically in line with the interior of the mould arrangement. The plate is passed under the mould arrangement and the electrode holder and feeder assembly is vertically adjusted to bring a lower end of the electrode means into contact with the upper surface and to establish current flow. On establishing current flow, the electrodes then are raised to establishing an arc between the electrodes and the uppermost surface, with charging or flux to mould arrangement establishing a molten slag pool which overlies that surface to submerge and extinguish that arc. Alloy powder material to said mould arrangement at the interface between the slag pool and the uppermost surface and melted in said mould arrangement to clad the uppermost surface as the metal plate is conveyed under the mould arrangement.

60 Claims, 18 Drawing Sheets

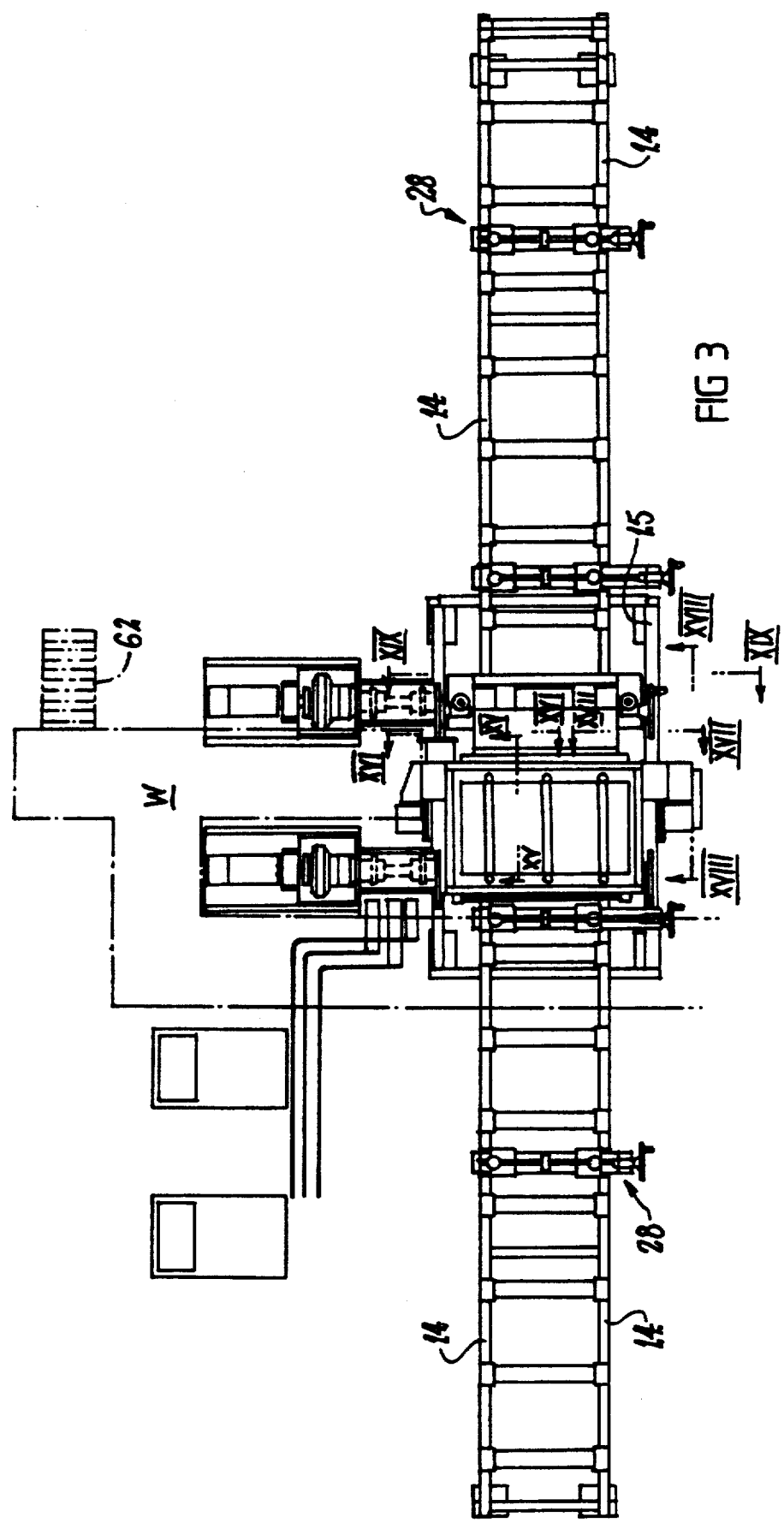

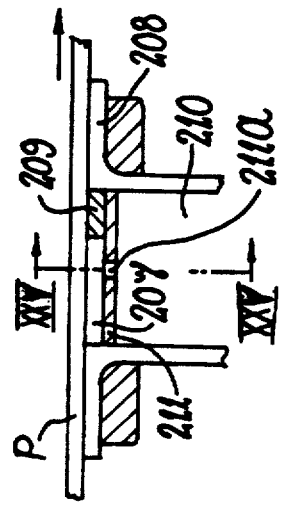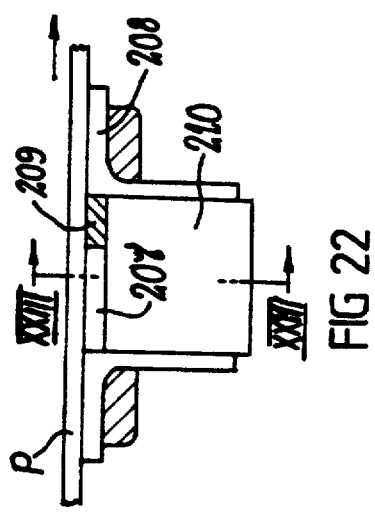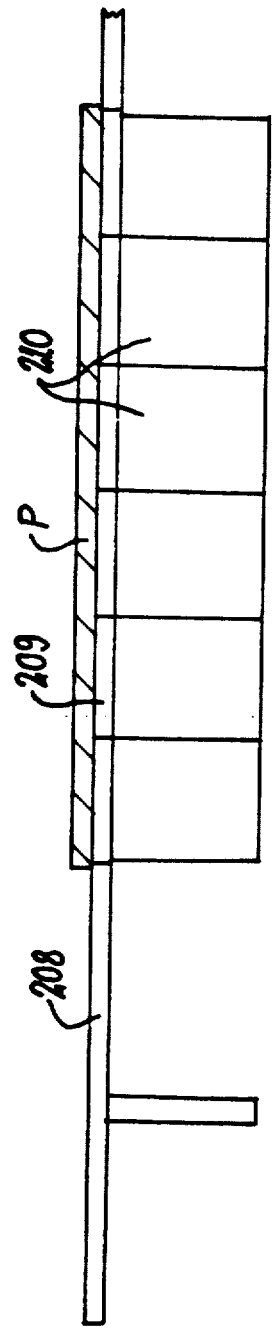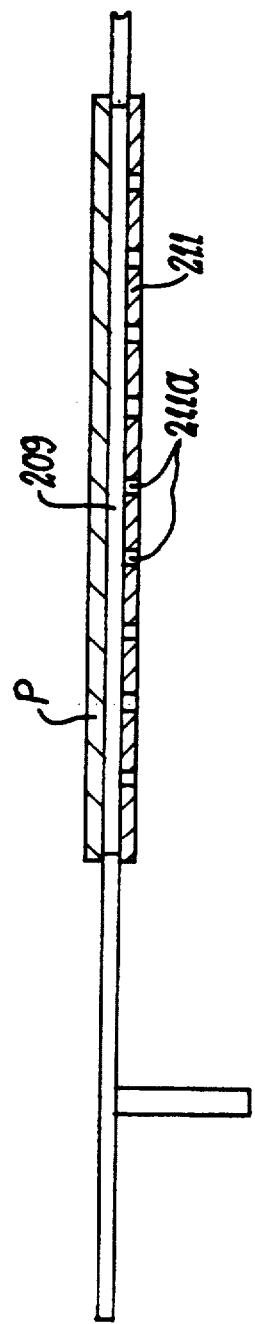

ELECTROSLAG SURFACING

This is a continuation of application Ser. No. 07/478,008, filed as PCT/AU88/00465 Dec. 3, 1987, now abandoned.

This invention relates to a method of and a machine for electroslag-surfacing of metal plate.

The invention enables metal plate of a selected thickness to be clad, over a major surface, on a continuous or semi-continuous basis. The invention can be used to clad metal plate of a variety of thicknesses, so as to achieve a wide variety of cladding to plate thickness ratios. The invention is particularly well suited to the cladding of relatively light gauge flat metal plate, such as from 4 to 12 mm thick, with a relatively thick layer, such as from 2 to 10 mm thick, of cladding metal. The metal plate may be mild or low alloy steel plate, while the cladding metal may be a wear and/or corrosion resistant material.

According to the invention, there is provided apparatus for electroslag surfacing of metal plate, the apparatus comprising a plate feeder assembly along which metal plate to be surfaced is conveyed during an electroslag cladding operation, the plate feeder assembly including an elongate, horizontally disposed feeder table having an approach-end section and a runout-end section; and an electroslag surfacing installation operable to clad an upper surface of the metal plate as it is conveyed along the plate feeder table, the surfacing installation being located intermediate said sections; the plate feeder assembly having conveying means, spaced along the feeder table, on which the metal plate is conveyed in a feeding direction from the approach-end section to, and beyond, the surfacing installation so as to discharge from the surfacing installation along the runout section; the surfacing installation including a flux mould arrangement positioned to contain molten flux during a cladding operation so that a sufficient depth of flux is maintained on said upper surface for efficient electroslag cladding; the surfacing installation further including an electrode holder and feeder assembly which is spaced over the plate feeder assembly, above the mould arrangement, and which extends laterally of the plate feeder assembly relative to said feeding direction; the electrode holder and feeder assembly being adapted to hold electrode means and being connectable to a power source for the supply of electric power to said electrode means for an electroslag operation, the electrode holder and feeder assembly being operable to adjust said electrode means vertically; the apparatus being such that, as metal plate to be surfaced by a cladding operation is conveyed along the plate feeder assembly in said feeding direction, the electrode holder and feeder assembly is operable:

to lower the electrode means into the mold arrangement to bring a lower end of the electrode means into contact with said upper surface of the metal plate and establish current flow therebetween, then to raise the electrode means to an operating height to initiate conditions providing an arc between said lower end and upper surface, and with establishment of a molten slag pool in said mould arrangement which submerges said arc, to retain said lower end of the electrode means at a spacing from the upper surface sufficient to maintain said arc and efficient electroslag operation.

The metal plate may be conveyed along the plate feeder assembly on a continuous or semi-continuous basis during the cladding operation. Depending in part on the thickness of the plate, it can be supplied continuously from a roll, or semi-continuously in suitable plate lengths, so as to pass along the plate feeder assembly, from the input end to an output end of the assembly. The plate feeder assembly preferably has drive means by which the plate is moved along the conveying means in the feed direction.

Each section of the feeder table may comprise a horizontally disposed frame structure, having elongate side members which are secured in laterally spaced relationship by transverse connecting members. The frame structure preferably is supported in its horizontally disposed position on a base, such as by a number of support posts on which the frame structure is held above the base.

The conveying means may consist of a series of conveyor rollers which are laterally spaced from each other along the table. The rollers preferably are rotatable on axes extending transversely with respect to the feed direction, the rollers of the series being spaced from each other in said direction, each roller having its ends journalled in a respective bearing block adjacent a respective said elongate side member. Each conveyor roller may have each of its ends journalled in bearing blocks mounted in or on a respective one of the elongate side members of the table. All of the conveyor rollers may be freely rotatable and able simply to rotate to convey the metal plate along the table under the action of the drive means. Alternatively, at least one of the conveyor rollers may form part of the drive means, and be rotatable under the action of a drive motor. Biasing means act preferably on the upper surface of the plate to maintain the plate in driving engagement with the at least one conveyor roller.

The drive means preferably includes a transverse pair of vertically spaced feed rollers between which the plate passes, and a drive motor driving at least one of those rollers. A lower one of the pair of feed rollers may have its ends journalled in a respective bearing at each side of the feeder table, such as in a support structure mounted in or on the elongate side members of the table. The lower feed roller preferably is driven by the drive motor, such as by an axially in-line coupling between that roller and an output shaft of the drive motor. The upper one of the pair of feed rollers may have its ends located in, and adjustable along, vertical slides defined, for example, by the support structure in which the lower roller is journalled. The upper roller preferably is vertically adjustable relative to the lower roller to enable variation in clamping pressure exerted by the pair of feed rollers on the plate passing therebetween.

The upper roller, which may be coated with a deformable layer, may be adjustable by means of adjustment means comprising back-up jacks or screws. Adjustment may be provided by a transverse bar mounted over the adjustment means, and journalled at each end so as to be rotatable to simultaneously raise or lower each end of the upper feed roller via its adjustment means. The arrangement may be such that rotation can be effected from either side of the plate feeder assembly.

The plate feeder assembly may have a respective drive means at both the approach-end section and the runout-end section of the feeder table, such as respective pairs of rollers as described. Thus, the arrangement may be such that plate is fed positively to the surfacing installation for cladding, and clad plate is fed positively away from that installation. Where such respective drive means are provided, each preferably is closely adjacent a respective end of the surfacing installation. Most preferably, plate passes over conveyor rollers to the drive means on the approach side of the installation and, after being clad at the surfacing installation, passes from the drive means on the runout side over further conveyor rollers.

Where such respective pairs of rollers are provided, the upper roller of the pair on the runout side preferably is allowed to float approximately 10 mm in the vertical direction to take up undulations within the plate surface. This may be made possible by means of hydraulic cylinders located between the upper roll chocks and jacking screws. A constant roll separating force of for example 5 tonnes preferably is maintained by a preset hydraulic accumulator mounted between the hydraulic cylinder and a hand pressure pump.

The plate feeder assembly preferably includes plate centering means. At least one centering means most preferably is provided in each of the approach side and the runout side of the table. The or each centering means acts to ensure the plate is conveyed substantially centrally through the machine. For this purpose, the centering means may engage the plate at each of its side edges, with side edge engaging members of the centering means preferably being laterally adjustable to accommodate plate of different widths. In one form, the or each centering means includes a pair of laterally spaced blocks between which the plate passes, with the blocks each being screw-engaged with a respective end of a rod journalled in bearings mounted on the feeder table. The rod may be fixed against axial movement and its rotation in one or the other direction causes the blocks either to move inwardly, or to move outwardly, in unison.

The flux mould arrangement may extend across at least substantially the full width of plate to be clad, preferably beyond the edges of the plate. It may comprise a peripheral wall bounding a mould cavity which is open top and bottom. The mould may be of rectangular form, preferably having a relatively small width in the plate feed direction compared with its length across the plate. At least a major portion of the bottom of the mould is closed by the plate to be clad. Where the mould extends beyond the edges of the plate, the remainder of the bottom preferably is closed by shoes resiliently urged against the edge of the plate, such as of respective strips or plates of graphite which are spring loaded against each of those edges. The shoes allow for thermal expansion of the plate during cladding, while they also act to retain molten flux and cladding material resulting from the electroslag operation.

The mould arrangement most preferably acts both as a mould and as a quench bar. For this latter purpose, the mould arrangement preferably is cooled by water circulated through a passage defined around the peripheral wall. Such cooling enables control over the thickness of slag cover remaining on the plate after cladding. The peripheral wall of the mould preferably is formed of copper or aluminium, with a steel support frame for overall rigidity.

The electrode holder and feeder assembly may hold a plurality of electrodes in laterally spaced relation across at least part of the lateral extent of the plate feeder assembly. It also is operable to adjust the electrodes vertically for establishing and maintaining efficient electroslag operation. Thus, the electrode holder and feeder assembly preferably is operable to lower the electrodes so that their lower ends are able to contact bare metal of the plate and, with current flow established, then to raise the electrodes to initiate arc conditions. Flux then is added to submerge the arc, and melted to establish the slag pool necessary for electroslag operation. The electrode holder and feeder assembly thereafter progressively lowers the electrodes to maintain efficient electroslag operation.

The electrodes preferably are non-consumable electrodes, such as strips or rods of graphite. In such case, the electrode holder and feeder assembly may have a header beam, or two or more header beams in end to end relation, on which a plurality of electrode holder and feeder units are mounted. The or each beam preferably is supported by a respective column at each side of the plate feeder assembly. A respective electrode holder and feeder unit preferably is provided for each electrode and includes an electrode holder and an associated adjustment means. Each adjustment means may provide reversible linear drive for its holder, such that the holder can be progressively raised or lowered. Most preferably, each adjustment means consists of a reversible stepping motor operable to raise or lower its electrode holder.

In one arrangement, an output shaft of each adjustment means may be coupled to its electrode holder by a drive gear, with the latter meshing with an elongate upwardly extending tooth bar or shaft of the electrode holder. In such arrangement, rotation of the drive gear by the motor raises or lowers the electrode holder.

In an alternative arrangement, the output shaft of the stepping motor may be coupled to an upwardly extending, threaded rod, with each electrode holder having a shaft parallel to the rod and a bracket mounted on the shaft having teeth meshing with the threaded rod. In the latter case, rotation of the rod under the action of the motor raises or lowers the bracket and, with the latter, the electrode holder.

As indicated, the electrode holder and feeder assembly is mounted above the flux mould arrangement. The lower ends of the electrodes held by that assembly extend into the mould arrangement, at least during an electroslag operation.

The electroslag surfacing installation may include a hearth block arrangement. This preferably is positioned immediately below the mould arrangement so as to engage the lower surface of plate being clad. The function of the hearth block arrangement is to provide a means for cooling the plate, from that surface. However, it also serves to maintain the plate in relation to the bottom of the mould arrangement and, hence, to maintain a required spacing between the electrodes and the plate.

In acting to maintain the plate in relation to the mould arrangement, the hearth arrangement preferably exerts an upward force on the plate. The surfacing installation may include clamping means, preferably adjacent the side of the mould arrangement facing the approach end; the clamping means applying a countervailing downwards force on the upper surface of the plate. The clamping means and the hearth block arrangement thus cooperate to maintain the plate in relation to the mould arrangement. The clamping means preferably is a freely rotatable clamping roll which extends laterally with respect to the plate feeder assembly. The clamping roll may have each end journalled in a respective spring loaded bearing housing at each side of the feeder table.

The hearth block arrangement preferably is secured between opposed sides of the plate feeder assembly. It most preferably is water cooled, to enhance cooling of the plate. The hearth block arrangement may include a cooling assembly through which water is able to be circulated, and a frame such as of steel in which the assembly is supported. The hearth block arrangement extends between opposed sides of the plate feeder assembly. The cooling assembly preferably is urged upwardly to bear against the lower surface of plate being clad, such as by provision of pneumatic or hydraulic cylinders. Most preferably, the cooling assembly comprises a plurality of cooling blocks arranged in series between opposed sides of the plate feeder assembly. In such case, each block of the cooling assembly may be individually urged upwardly by a respective such cylinder.

The cooling assembly may be formed of copper or aluminium to enhance the rate of heat transfer from the plate.

The surfacing installation preferably includes a flux feeder arrangement. The latter is located above the mould arrangement for the supply of flux thereto. The flux feeder arrangement may, for example, be located adjacent the electrode holder and feeder assembly, such as on the runout side of that assembly. As with the mould arrangement, the flux feeder arrangement preferably extends laterally of the plate feeder assembly, and it most preferably is operable to supply flux to the mould arrangement over substantially the full lateral extent of the latter.

The flux feeder arrangement may include a wide-roll feeder, having a flux hopper on the intake end of the feeder. It also may include at least one discharge and distribution chute on the output end.

With the machine of the invention, the plate to be clad preferably is precoated with a metered and consolidated mixture of alloy powders required to achieve the desired cladding chemical composition. However, it is not essential that the plate be precoated. Rather, the alloy powder can be charged to a flux pool maintained in the flux mould arrangement. Where the alloy powder is to be charged in this manner, the surfacing installation of the machine can include a metal powder feeder arrangement adjacent to the flux feeder arrangement; the powder feeder arrangement, for example, being of the form detailed for the flux feeder arrangement.

Current supply for electroslag operation preferably is by means of a power source connectable to the electrode holder and feeder assembly. Such source may be connected to busbars mounted adjacent to the or each beam of that assembly and connected to each electrode holder by flexible leads of a length accommodating vertical movement of the electrode holders. Current return may be by means of brushes in contact with the lower surface of the plate. Preferably, a plurality of brushes is positioned so that surface is contacted across substantially the full width of the plate. Each brush may be held against that surface by biasing means or by a pneumatic or hydraulic cylinder.

The machine of the invention may include control equipment operable to control various stages of the machine. The control equipment may include variable speed control and converter for the plate drive means, both on the approach and runout sections. It also may include variable speed drives and microcomputer control for the electrode feeders. The equipment additionally preferably includes microcomputer control for all of the previously mentioned control equipment, as well as operator initiated or automatic controls for fume exhaust, water cooling, flux feeding, air supply and, if provided, alloy powder feeding.

In order that the invention may more readily be understood, description now is directed to the accompanying drawings, in which:

FIG. 3 is a plan view of the machine of FIG. 1;

Figure 21:
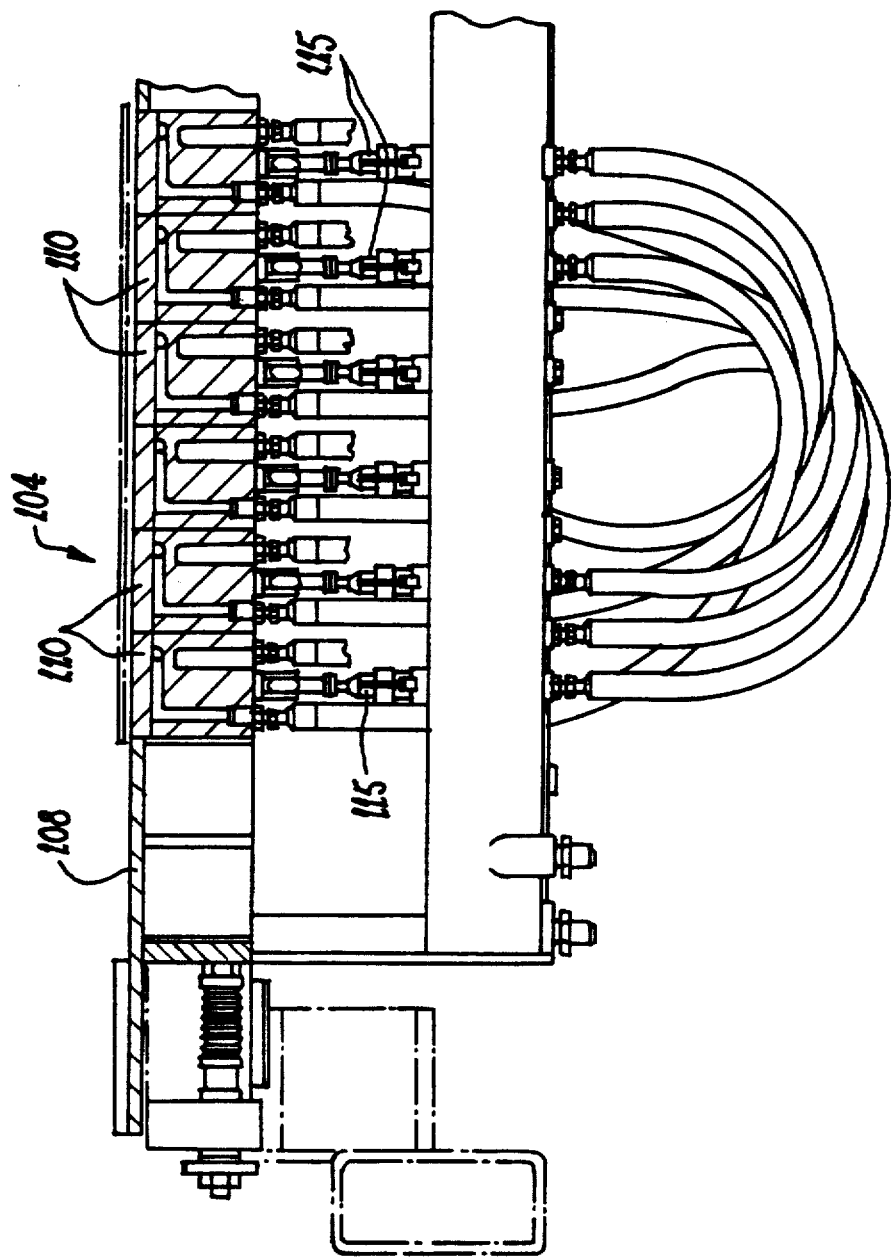
FIG. 21 is a sectional view on line XXI—XXI of FIG. 20.
Figure 20:
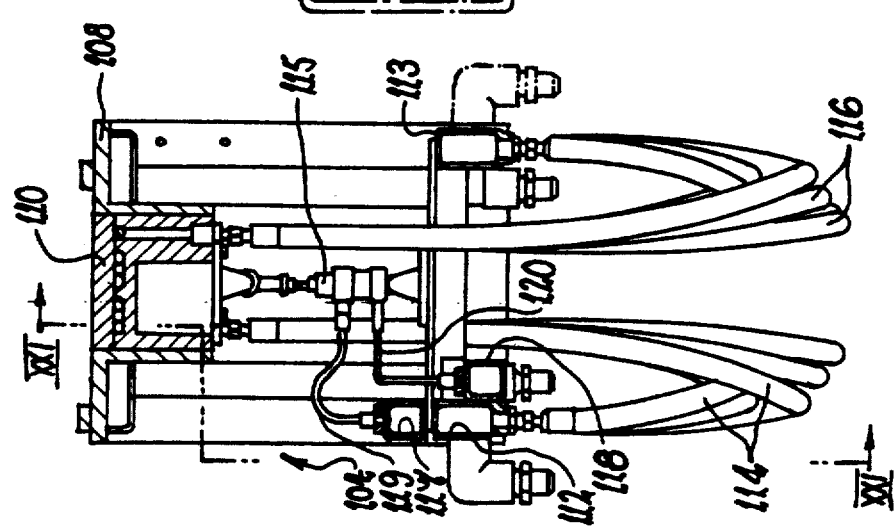
FIG. 20 is a sectional view on line XX—XX of FIG. 13.

FIGS. 22 and 23 correspond to the views of FIGS. 20 and 21, but illustrate a first modified hearth block assembly; and FIGS. 24 and 25 correspond to FIGS. 20 and 21, but illustrate a second modified hearth block assembly.

The machine 10 of the drawings has a plate feeder assembly comprising a table 12 having an approach section A, a runout section R, and a central section C at which a surfacing installation S is provided between sections A,R. Plate P to be clad is able to pass along table 12 from the left hand end of section A, to pass through the surfacing installation S at which it is to be clad, and to exit along section R to be discharged from the right hand end of table 12.

Each section A,R comprises an elongate frame formed of metal members. Sections A,R comprise side members 14 held in spaced relation by transverse members 16, and supported on posts 18. At section C, the width of table 12 is increased between side members 15, to accommodate installation S. Along section A, there is a plurality of conveyor rollers 20, each having its ends journalled in bearings 22 mounted on each side member 14. Section R has conveyor rollers 24 similarly journalled in bearings 26. Plate P approaches installation S on rollers 20 and exits therefrom on rollers 24.

To ensure plate P moves centrally along sections A,R and through installation S, each section A,R has two centering devices 28. In each case, the device 28 comprises an opposed pair of blocks 30, each of which bears against a respective edge of plate P. Blocks 30 are adjustable to accommodate plate of different widths, by each being threaded on a respective, oppositely threaded end of rod 32. A central bracket 34 restrains rod 32 against axial movement while enabling it to rotate. Either of the wheels 36 at each end of rod 32 enables rotation of rod 32 to adjust blocks 30 inwardly or outwardly in unison.

Figure 2:
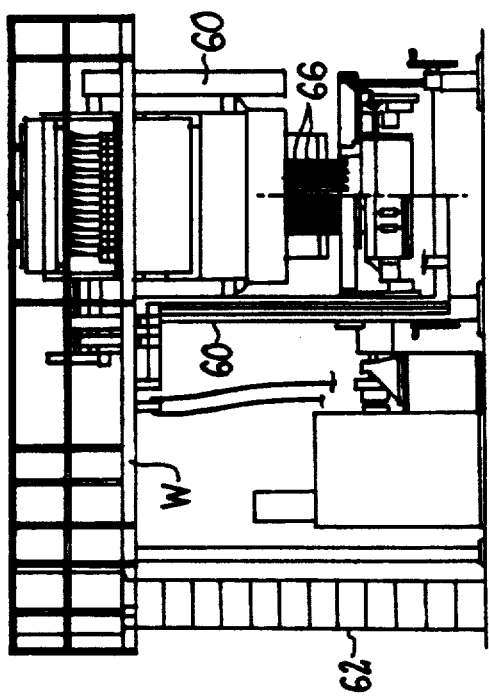
FIG. 2 is a sectional view on line II—II of FIG. 1.
Figure 1:
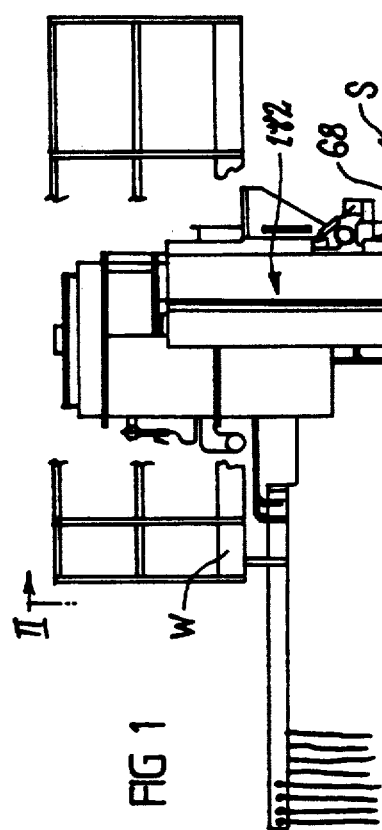
FIG. 1 is a side elevation of a machine according to the invention.
Figure 4:
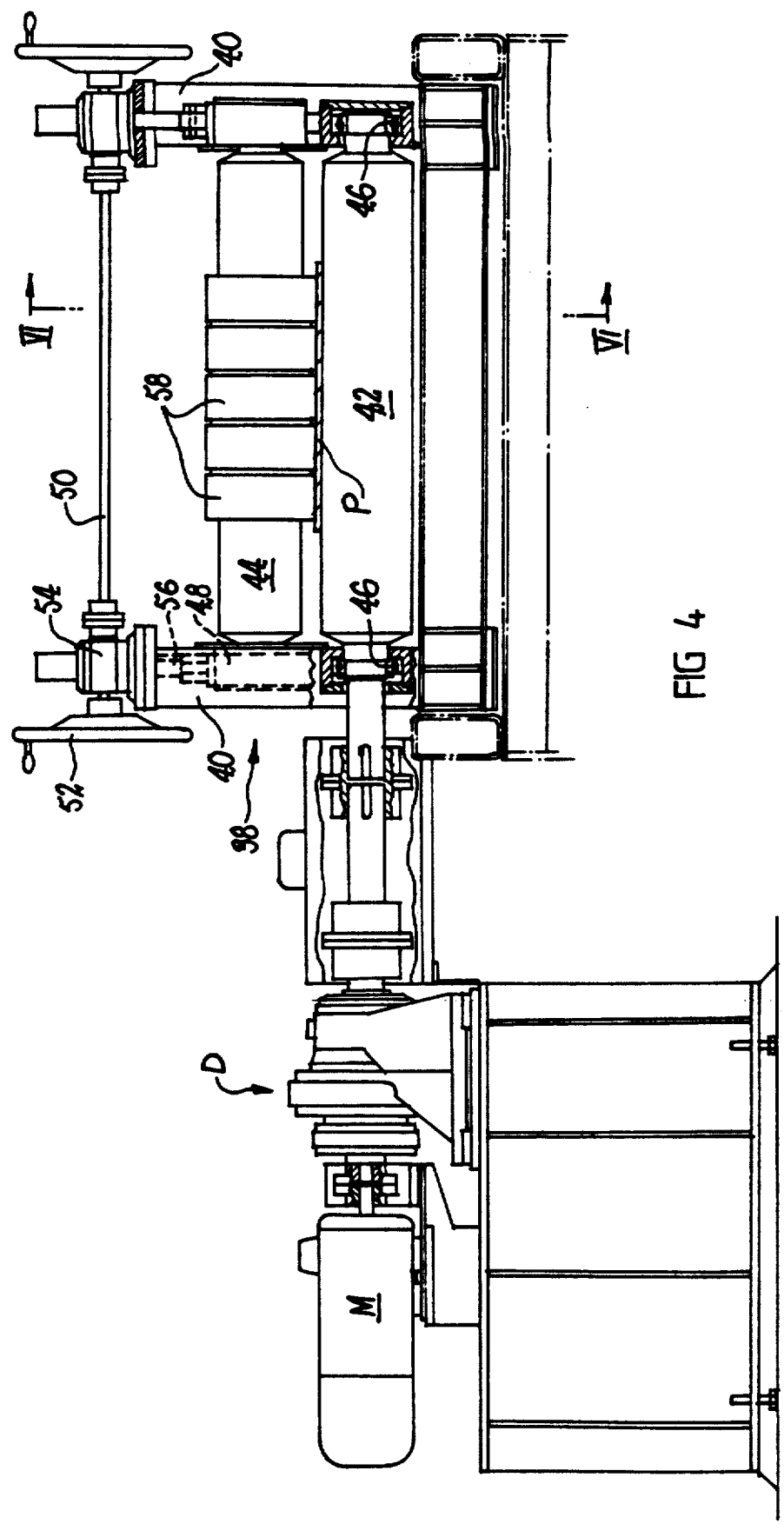
FIG. 4 is a part sectional view taken on line IV—IV of FIG. 1.
Figure 5:
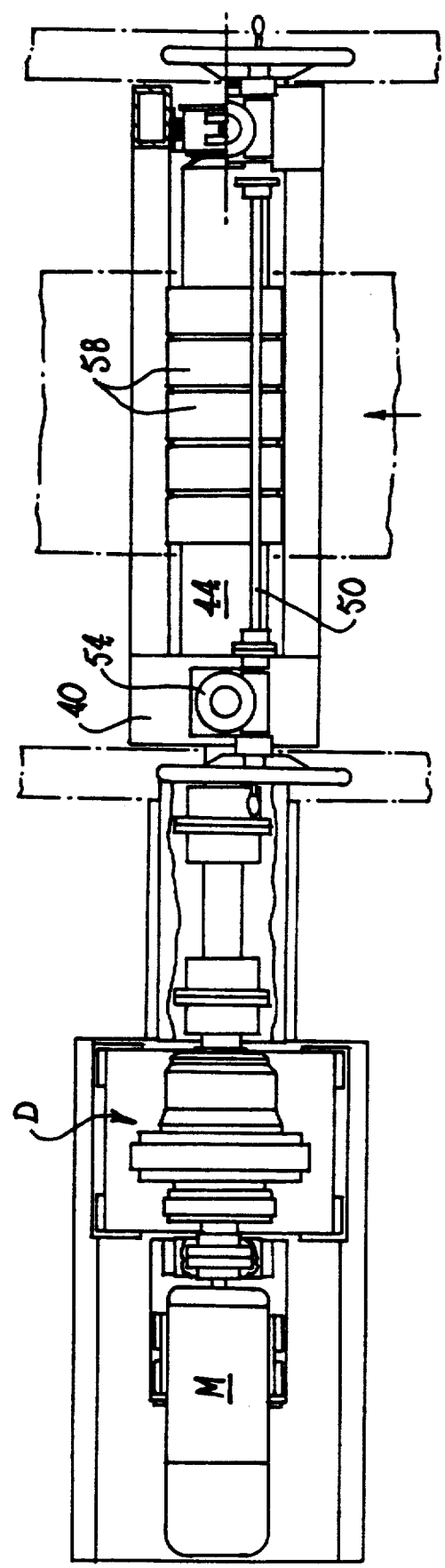
FIG. 5 is a plan view of the part of the machine shown in FIG. 4.
Figure 6:
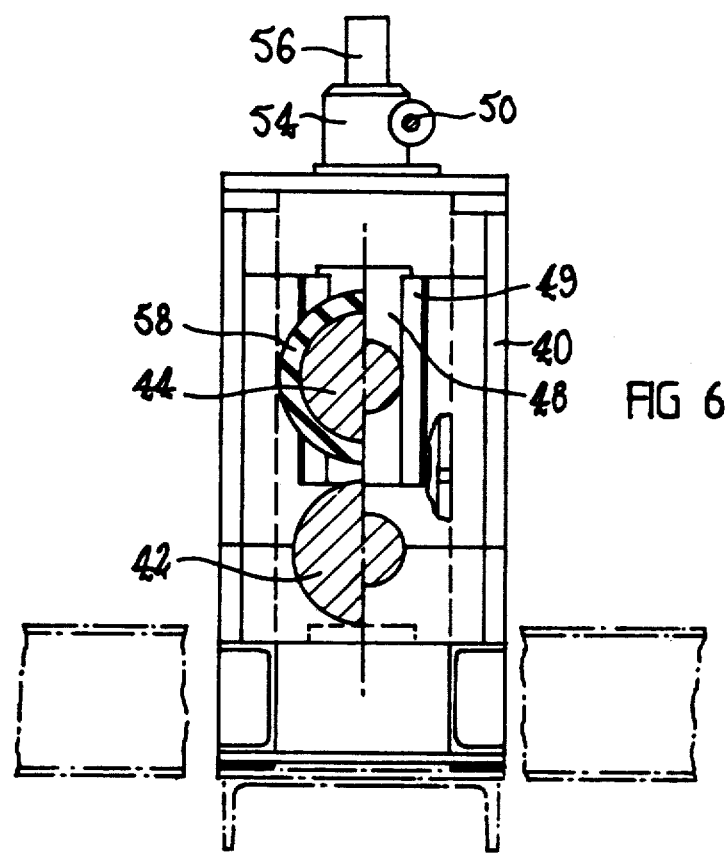
FIG. 6 is a sectional view taken on line VI—VI of FIG. 4.

At the approach side of installation S, there is provided a plate feeder arrangement 38, while a further such arrangement 39 is provided on the outgoing side. Arrangements 38,39 provide drive means by which plate P is moved through machine 10. Arrangement 38 has an opposed pair of supports 40, each mounted on a respective member 15, a lower roller 42 and an upper roller 44 (see FIGS. 4 to 6). Roll 42 has its ends journalled in bearings 46 mounted in supports 40, and is rotatable by means of variable speed motor/gearbox drive M via axially in-line drive arrangement D. Roll 44 has its ends journalled in bearing blocks 48 which are vertically adjustable in a guideway 49 defined in each support 40. For this purpose, an adjustment rod 50 extends across the upper end of each support 40, and is rotatable from either end by a wheel 52. On top of each support 40, there is a gear housing 54 through which rod 50 extends, with a threaded section on rod 50 meshing with a gear of a gear train within each housing 54. Rotation of rod 50 causes the gear trains to raise or lower spindles 56, each coupled to a respective bearing block 48, to raise or lower roll 44 and to adjust the pressure with which plate P is clamped between rolls 42,44 to achieve positive drive for plate P under the action of motor/gearbox M. Rolls 42,44 are simple cylindrical rolls, with upper roll having a resilient sleeve 58 where, as detailed below, plate P is precoated with a layer of alloy powder to provide the required cladding material. Sleeve 58 minimises break up of such coating, and may for example be of urethane and/or rubber.

Figure 9:
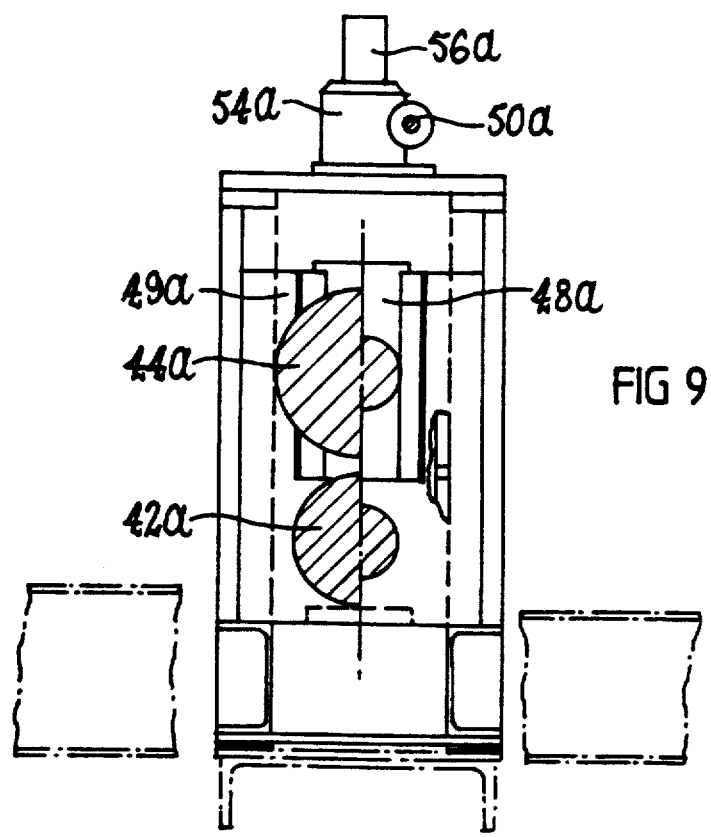
FIG. 9 is a sectional view taken on line IX—IX of FIG. 7.
Figure 7:
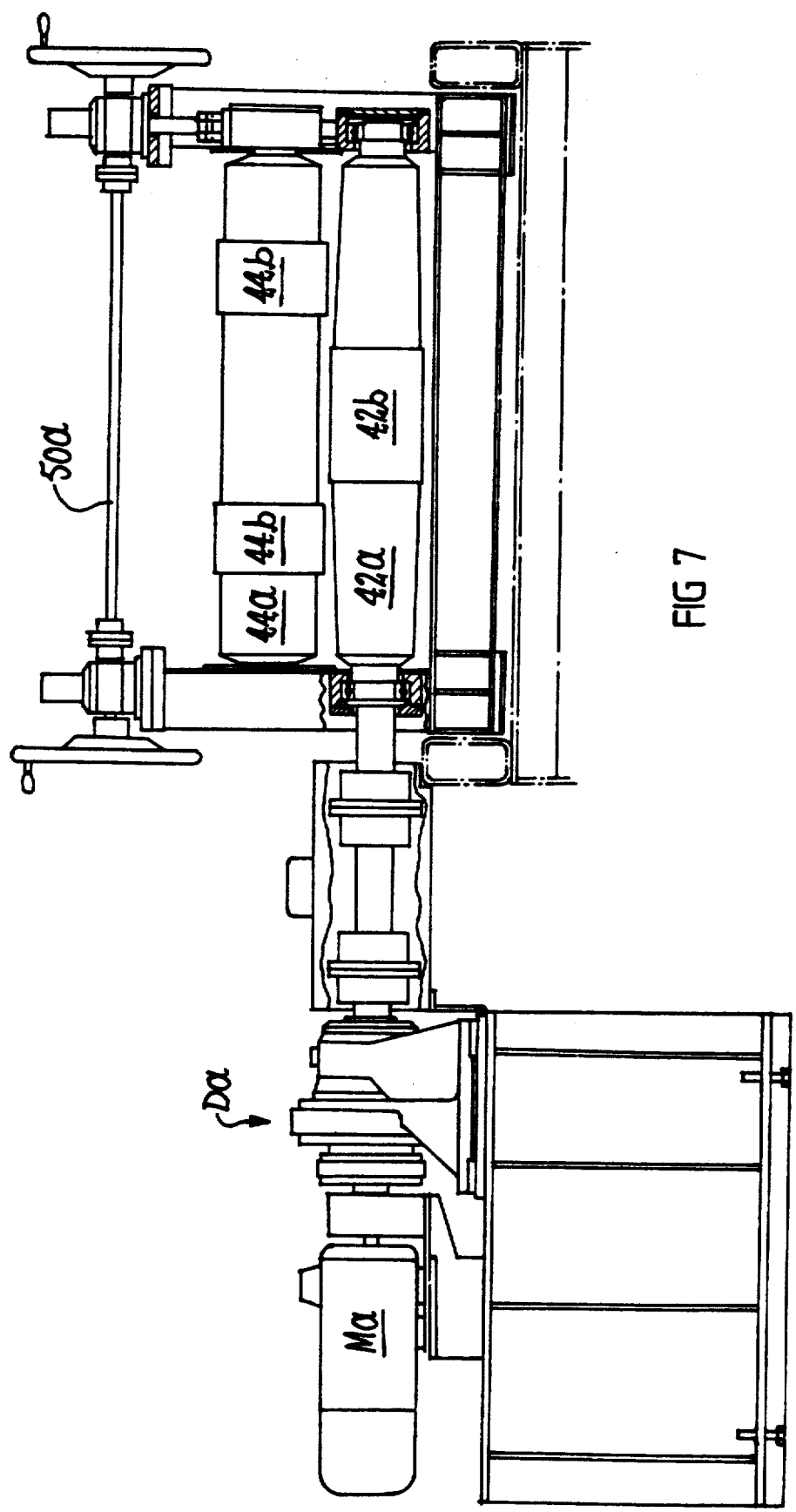
FIG. 7 is a part sectional view taken on line VII—VII of FIG. 1.
Figure 8:
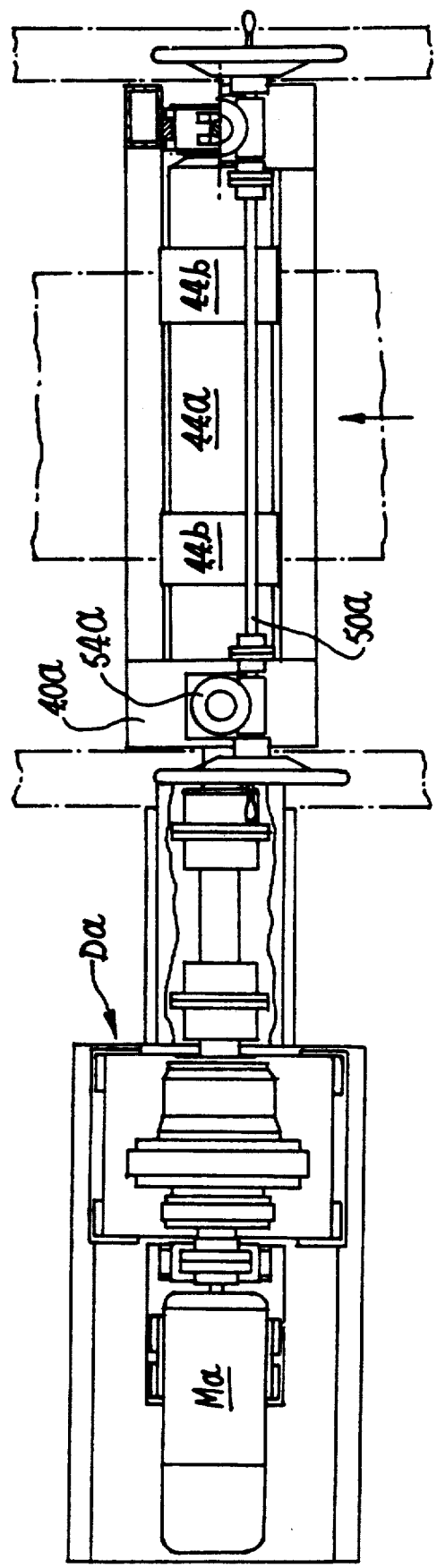
FIG. 8 is a plan view of the part of the machine shown in FIG. 7.

Arrangement 39 (see FIGS. 7 to 9) is similar overall to arrangement 38, and corresponding parts are identified by the same reference numeral with the suffix "a". However, upper roll 44a does not have a resilient sleeve since, by the time plate P reaches arrangement 39, the cladding has been provided on plate P and, while solidified, is still at a temperature level at which such sleeve on roller 44a would be destroyed. However, lower roll 42a differs in that it is profiled to provide a central land 42b about 300 mm wide, while upper roll 44a is profiled to provide a respective land 44b offset axially from each end of land 42b. Alternatively, the upper roller may have a central land about 700 mm wide, with shims about 5 mm thick being fed between that roller and the plate, along the edges of the latter. These arrangements provide a counterbending force along the edge of the plate, at temperatures above about 100° C., and produce relatively flat clad plate after cooling to ambient temperature and contraction of the cladding or overlay.

Motor/gearboxes M, Ma, and their drives D, Da, are similar. In a commercially operable system suitable for cladding steel plate of for example 5 to 12 mm thick and 300 to 1000 mm wide, with a cladding of 2 to 10 mm thick, the rolls 42,42a can each be driven suitably by a 0.75 kW D.C. variable speed motor through a CYCLO-DRIVE gearbox with a ratio of the order of 7569:1. Such drive can enable variation of plate seed between 0.25 to 2 mm/sec.

The machine includes electronic controls to monitor speed and torque of, and between, each of arrangements 38,39.

Surfacing installation S provides for electroslag cladding of plate P. This is achieved in an arrangement in which plate P is precoated with a metered and consolidated mixture (not shown) of alloy powders required to achieve a selected chemical composition for the cladding. In general terms, an electroslag pool (resistive heated by current flow between non-consumable graphite electrodes and plate P) is locally contained in a water-cooled mould on the surface of plate P as the latter moves through installation S. The precoated plate P is fed to installation S via feed rollers 42,44. In passing to installation S, plate P passes through a clamping assembly which cools the lower surface of plate P during an electroslag melting operation performed on the upper surface of plate P.

At installation S, machine 10 has at each side thereof a respective main column 60. Between the upper ends of columns 60 a working platform structure W is supported. Structure W is shown in FIG. 3 in shaded outline and, as indicated therein, structure W enables an operator to move around and gain access to the upper extent of machine 10. Access to structure W is via steps 62.

Between the upper extent of column 60, there is an assembly 64 by which electrodes 66 are held and fed. On the runout side of assembly 64, there is an assembly 68 for the supply of flux while, below assemblies 64 and 68, and between installations 38 and 39, there is an assembly 70 in which electroslag operation is conducted.

Figure 10:
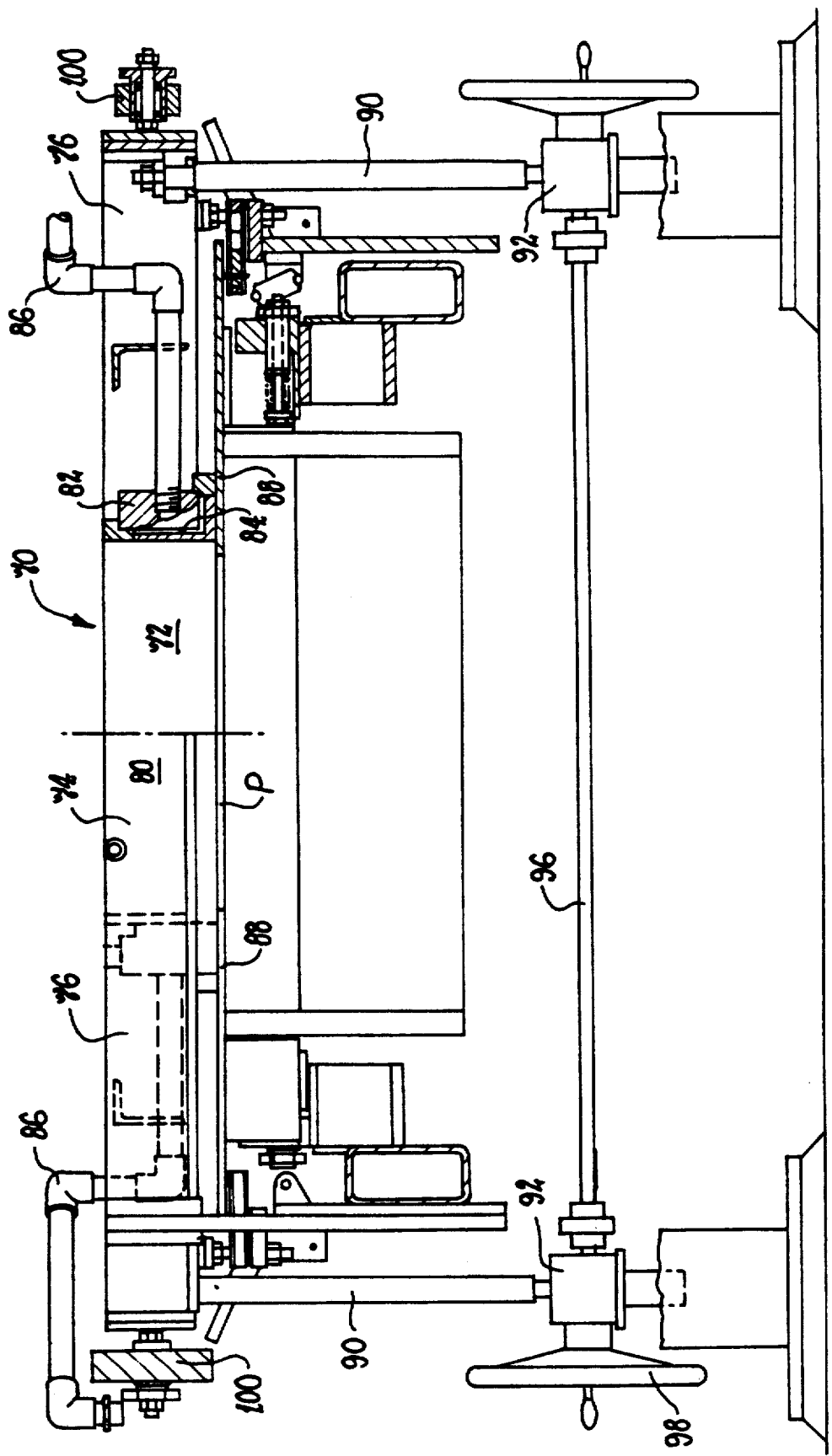
FIG. 10 is a part sectional view taken on line X—X of FIG. 1.
Figure 11:
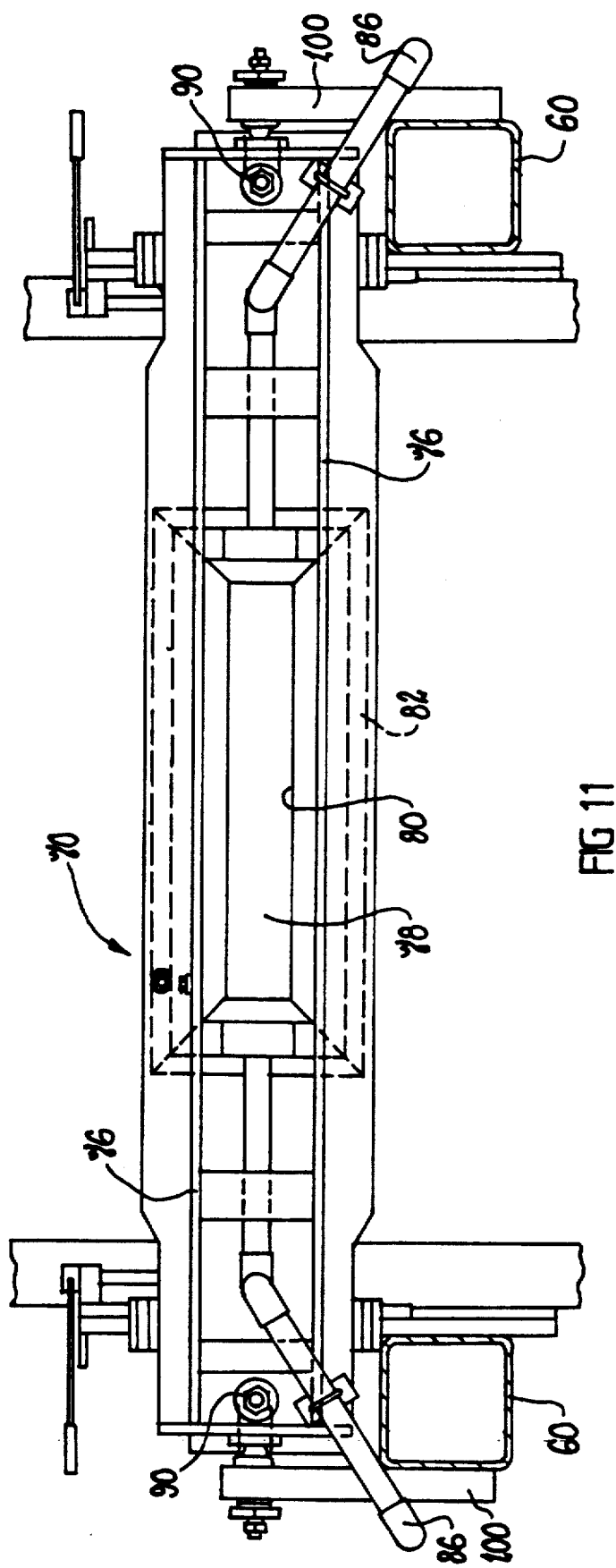
FIG. 11 is a plan view of the part of the machine shown in FIG. 10.
Figure 12:
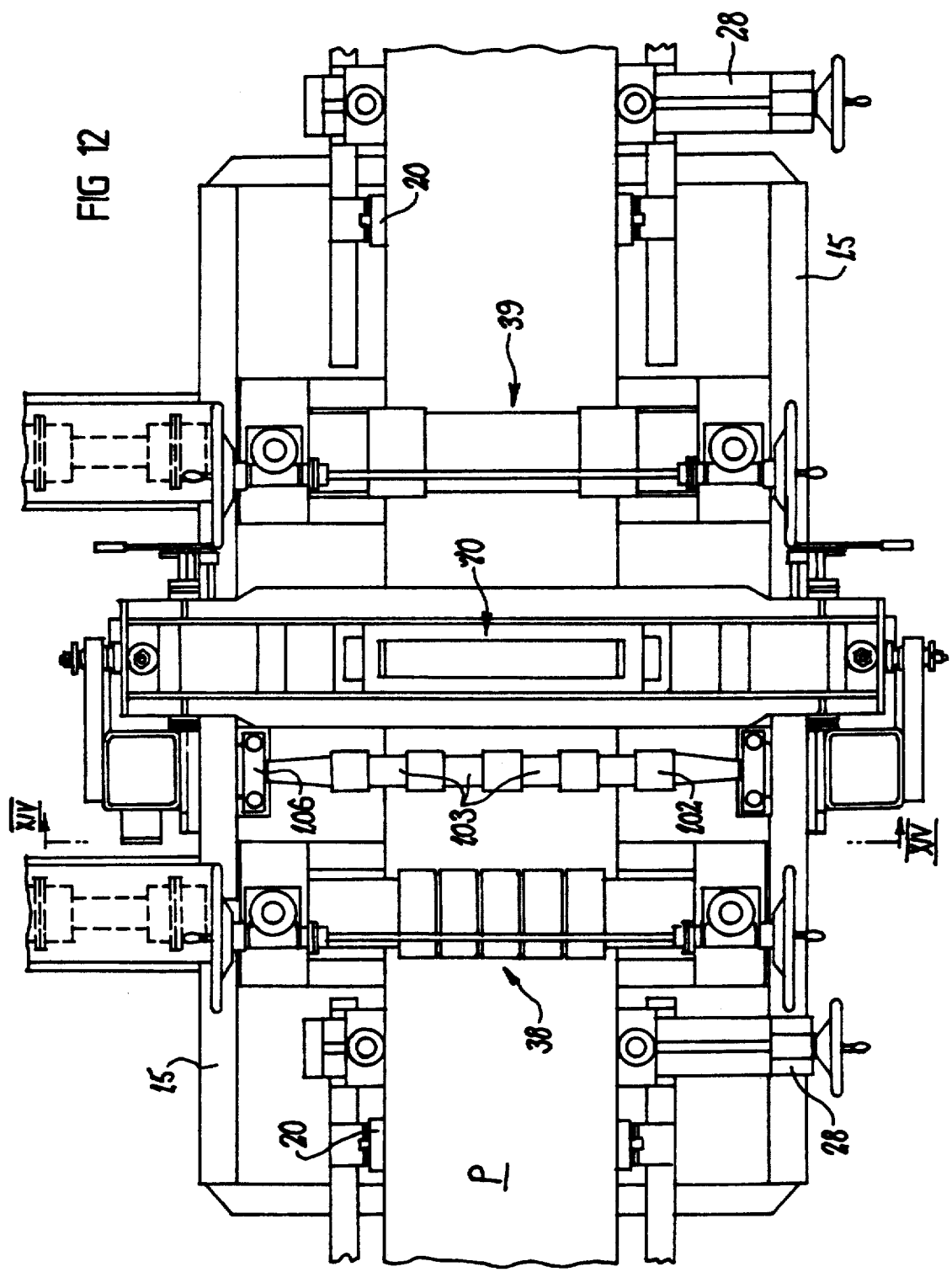
FIG. 12 is a part sectional view taken on line XII—XII of FIG. 1

Turning first to assembly 70 and, in particular, to FIG. 10 and 11, assembly 70 comprises a flux mould and quench bar constructed as one unit 72. The latter includes an elongate rectangular trough 74 having an extension bracket at each end by which it is supported adjacent each column 60. Trough 74 is open top and bottom, and is positioned so that its cavity 78 is substantially closed from below by the upper surface of plate P. Trough 74 has a peripheral wall 80 of copper or aluminium and an outer steel backing frame 82 provided for rigidity. A passage in wall 80 enables cooling water to be circulated through trough 74, principally at the exit side thereof, via pipes 86. At each end of trough 74, there is provided a respective spring loaded sheet 88 of graphite, each of which bears against an edge of plate P and completes the closure of the cavity 78, while also accommodating thermal expansion of plate P during cladding.

Trough 74 provides means for maintaining a localised molten flux pool on the upper surface of plate P. However, the water cooling also enables it to function as a quench bar, controlling the thickness of slag cover on the surface of plate P as the latter moves beyond cavity 78.

The support for unit 72 enables adjustment of its length to accommodate plate and precoating of different thicknesses. As shown in FIGS. 10 and 11, the outer end of each bracket 76 is supported on the upper end of the output shaft 90 of a respective worm gear actuator 92 mounted on bracket 94 of column 60. Actuators 92 are coupled by a through-shaft 96 having a wheel 98 at each end. Rotation of shaft 96 via either wheel 98 drives both actuators 92 in unison, to raise or lower unit 72 via shafts 90. An arm 100 of each bracket 76 bears against a respective column 60 and stabilises unit 72 in a central position relative to the path of travel of plate P.

Between unit 72 and installation 38, there is a clamping roll 102 while, below unit 72, there is a hearth block assembly 104. Roll 102 is positioned to engage the upper surface of plate P and to maintain a required clearance (nominally 1 mm) between the upper surface of plate P and the bottom of trough 74, by ensuring that the lower surface of plate P bears on hearth blocks of assembly 104. Roll 102, which is solid but provided with machined relief grooves 103, is journalled in bearing housings 106 on side members 15. Housings 106 are spring loaded in order to accommodate uneven coating on plate P, or to accommodate different plate and/or precoating thicknesses.

Assembly 104 assists in maintaining the correct relationship between electrodes 66 and plate P, while it also provides means for cooling plate P from its lower surface directly under unit 72. As shown in FIGS. 20 and 21, assembly 104 consists of a steel frame 108 supporting a series of hearth blocks 110 which extend transversely between side members 15. Blocks 110 are formed of copper or aluminium, and are cooled by water circulated therethrough via supply and return manifolds 112,113 and connecting hoses 114,116. Each block 110 is held against the lower surface of plate P by a respective pneumatic cylinder 115 supplied with air via supply and return manifolds 117,118 through hoses 119,120.

While a single water cooled hearth block can be used, a series of blocks as shown has the advantage of enabling relative movement between the individual ones of blocks 110. The series arrangement thus is able to accommodate transverse warping of plate P due to heating during electroslag operation, by adjustment permitted by cylinders 116; thereby maintaining cooling across the full width of the lower surface of plate P despite warping. Blocks 110 are accurately machined for good thermal contact.

Electrode holder and feeder assembly 64 includes a transverse beam structure secured to columns 60, and including header beam 122 with attached plate 123, and lower beam 124 with attached plate 125. For each electrode 66, there is a respective stepping motor 126, each of which has an output shaft connected to a threaded axially in-line shaft in a slotted conduit 128. The conduit for each motor is fixed to each of plates 123,125. Parallel to each conduit 128, there is a respective rod 130 of a holder 132 for each electrode. Each rod 130 is coupled to the output of a respective motor 126 by a pair of connectors 134 each of which extends through the slot of the respective conduit 128 and is in threaded engagement with the shaft therein. The arrangement is such that operation of each motor 126 causes rotation of the shaft in its conduit 128, resulting in connector 134 and, hence, the associated holder 132 and its electrode 66, to be raised or lowered.

At the lower end of rods 139, each holder 132 has an integral arm 136 which projects in the runout direction. Each electrode 66 is secured at the free end of the respective arm 136 so as to depend vertically above cavity 78 of trough 74 of assembly 70. The electrodes thus are able to be lowered individually, under the action of the respective motor 126, to bring the bottom end of each electrode into contact with, or to a required spacing from, plate P.

Rod 130 and arm 136 of each holder 132 defines a passage-way therethrough. Cooling water is able to be supplied from pipe 138, hose 140, manifold 142, supply and return hoses 144, return hose 146 and drain pipe 148, for cooling the entire length of holder 132.

Above manifold 142, busbars 150,151 are supported between columns 60, with electric power supply to busbars 150 passing to each electrode holder 132 via electric cables 152. Return of electric current is via assembly 154, located between columns 60, immediately below clamping roll 102.

Figure 13:
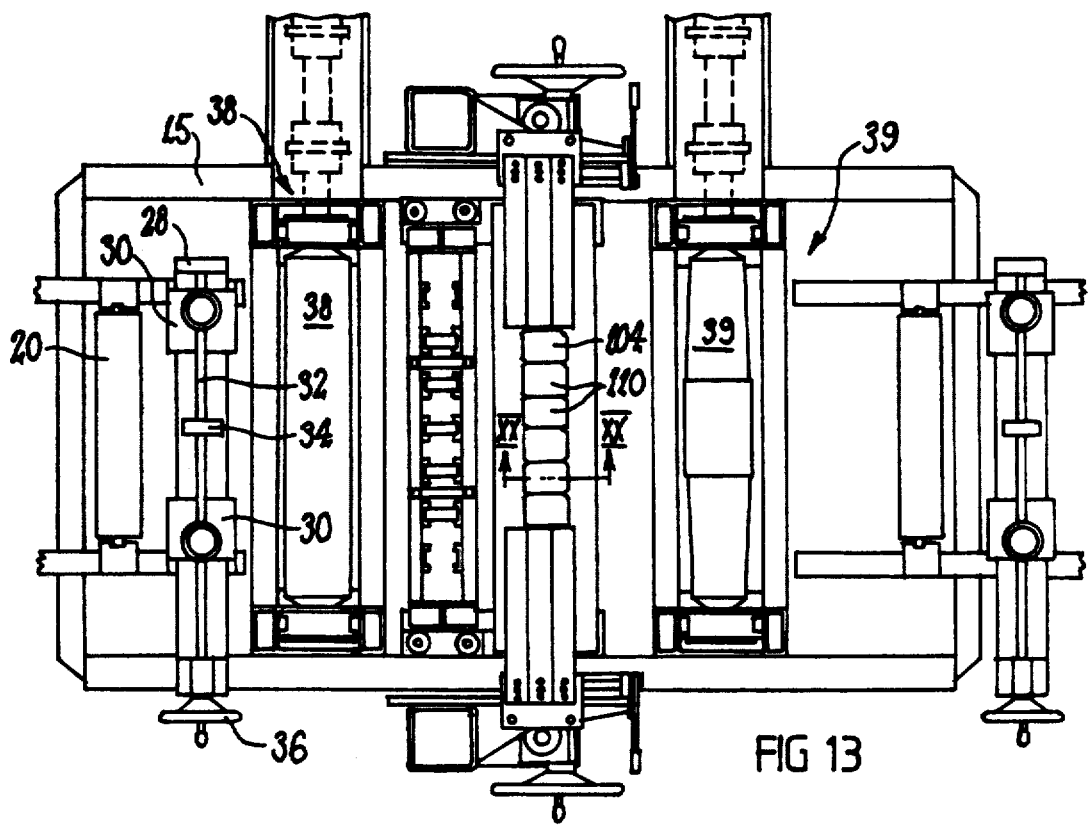
FIG. 13 is a sectional view taken on line XIII—XIII of FIG. 1.
Figure 14:
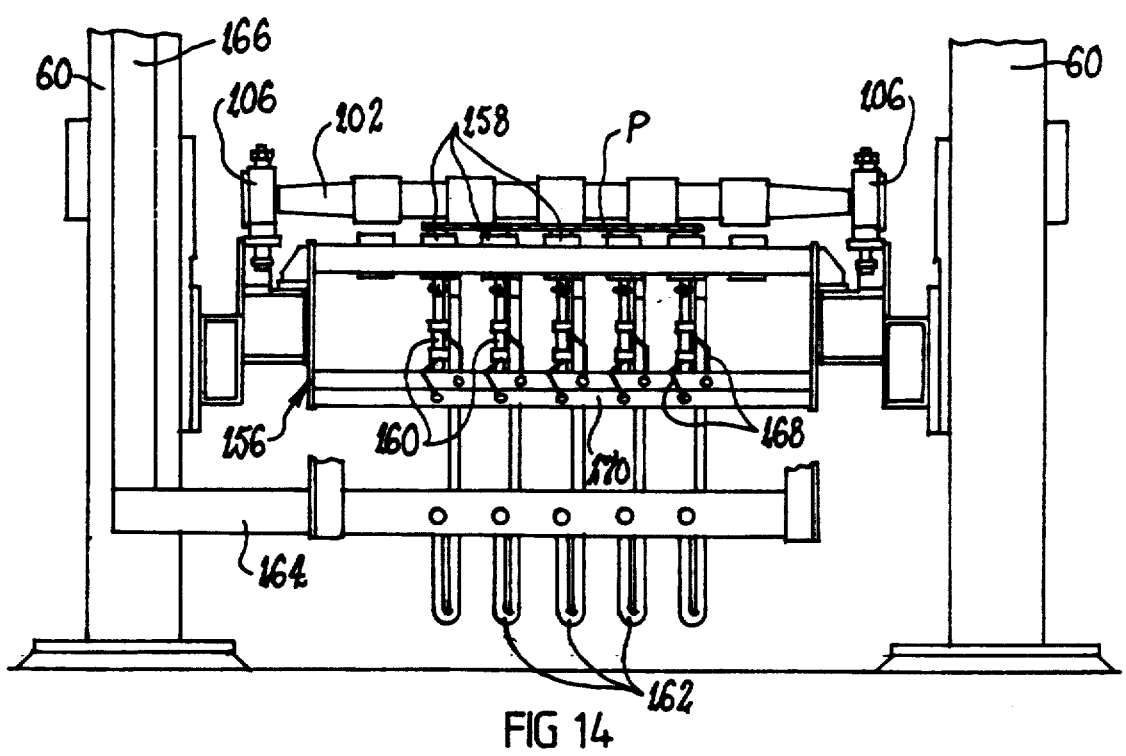
FIG. 14 is a view taken on line XIV—XIV of FIG. 12.
Figure 15:
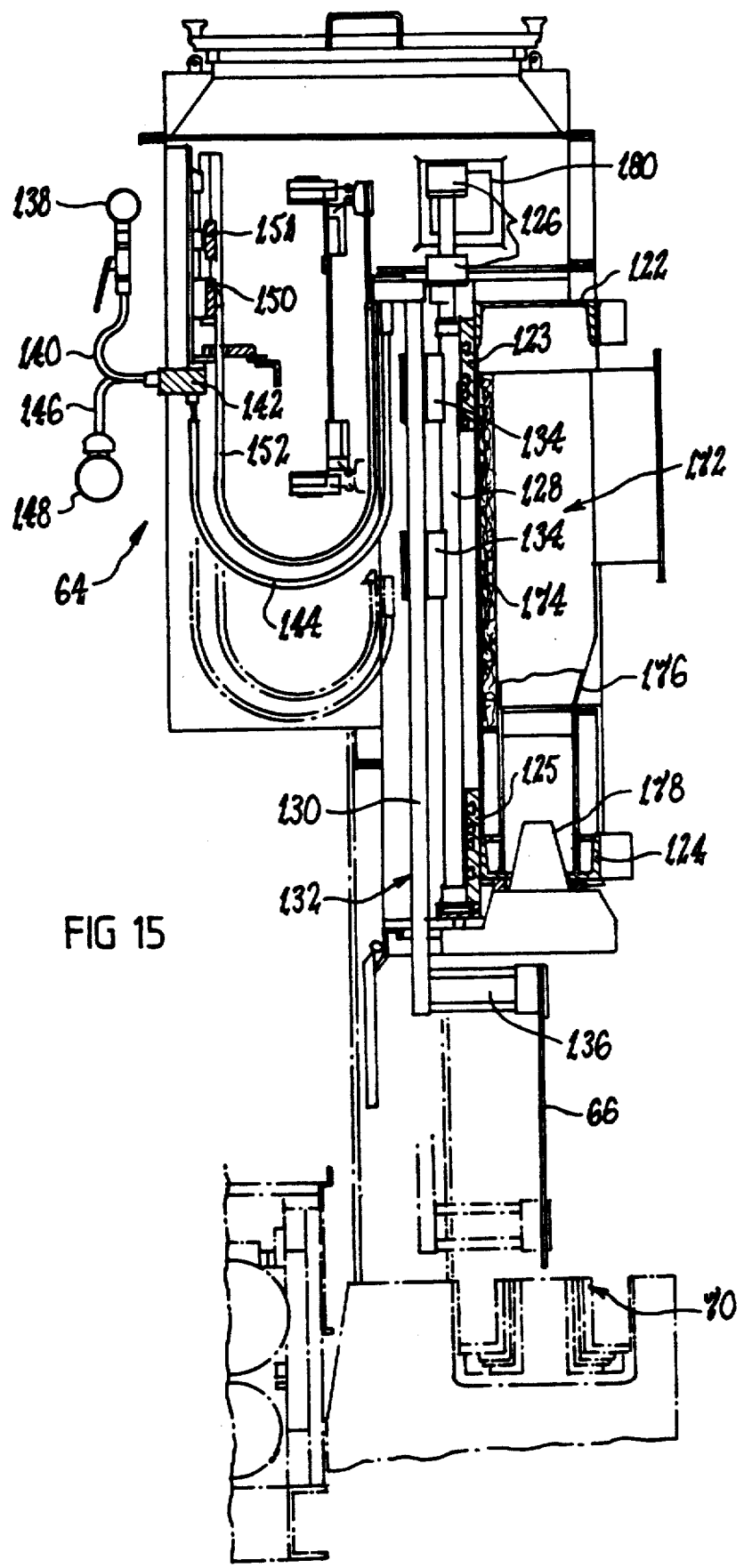
FIG. 15 is a sectional view taken on line XV—XV of FIG. 3.
Figure 16:
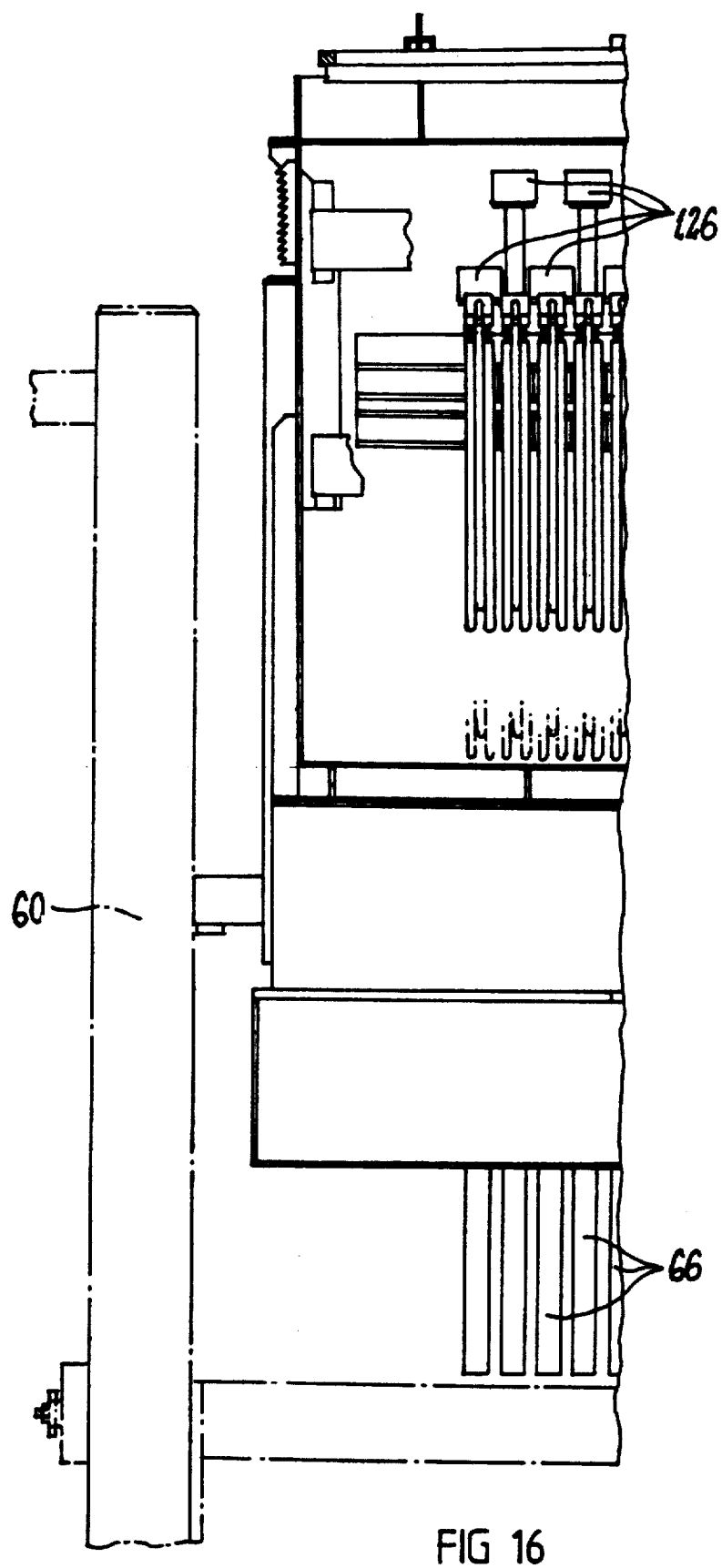
FIGS. 16 and 17 are respective half sectional views taken on lines XVI—XVI and XVII—XVII of FIG. 3.
Figure 17:
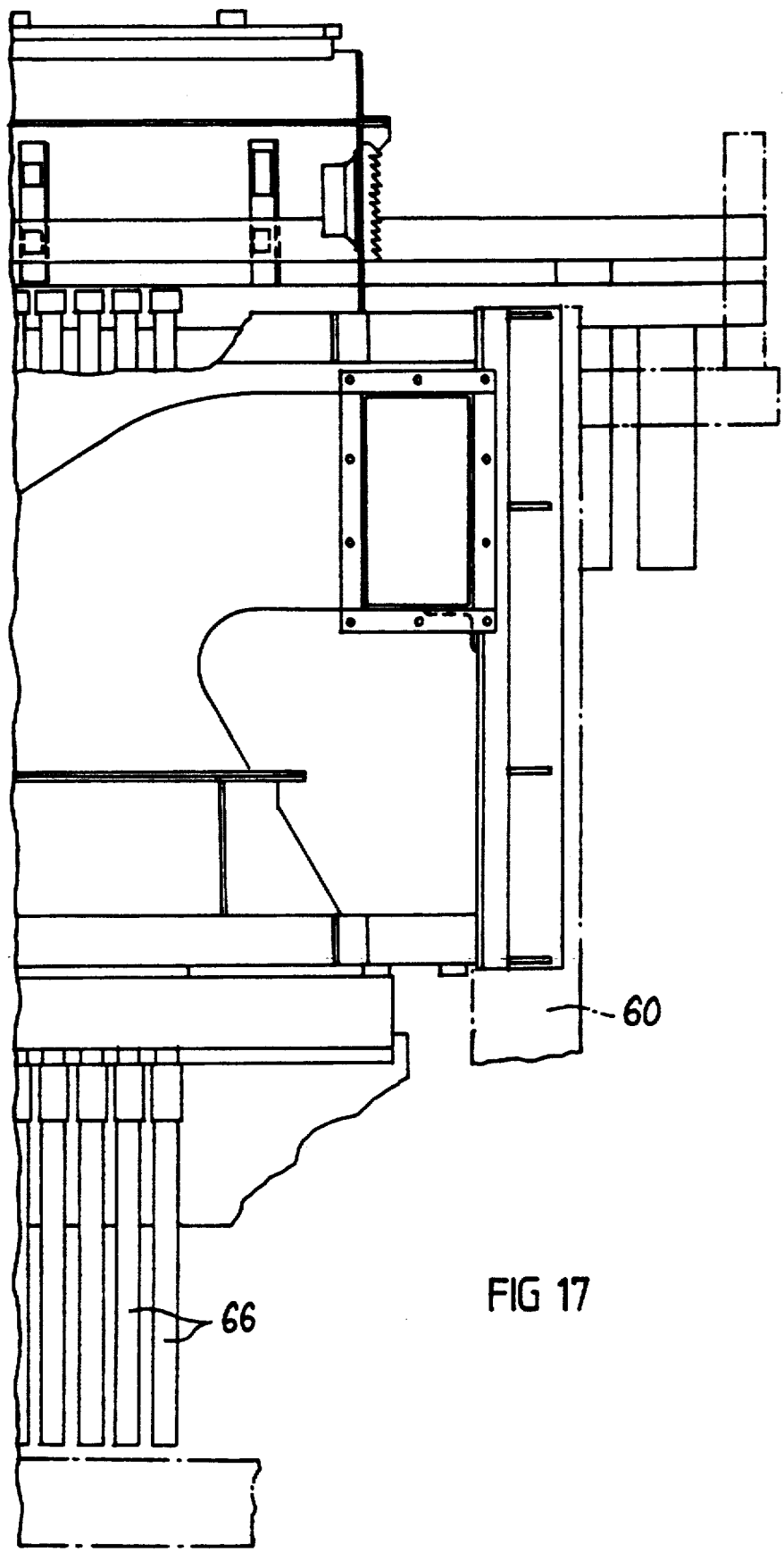
Figure 18:
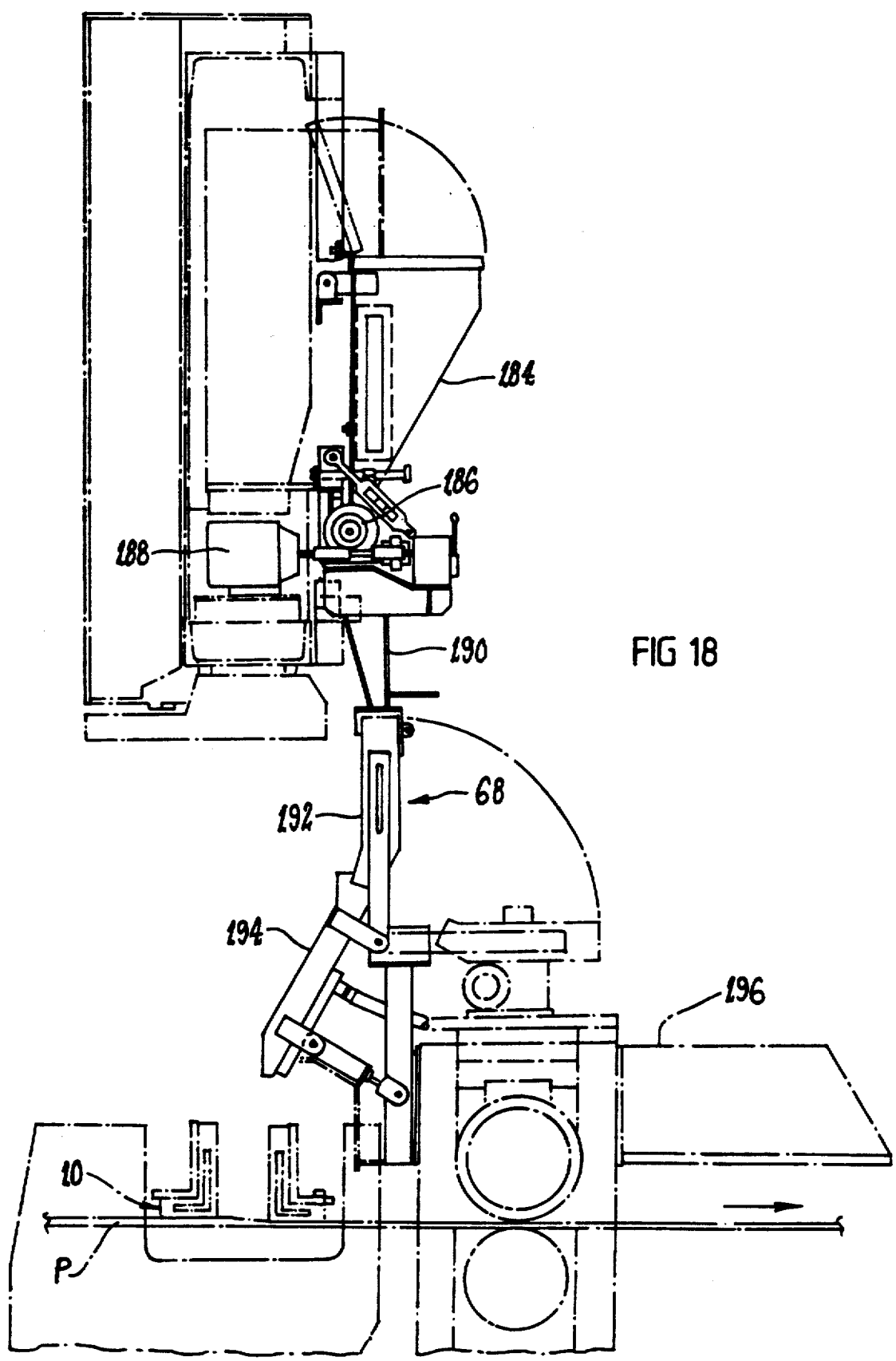
FIG. 18 is a sectional view taken on line XVIII—XVIII of FIG. 3.
Figure 19:
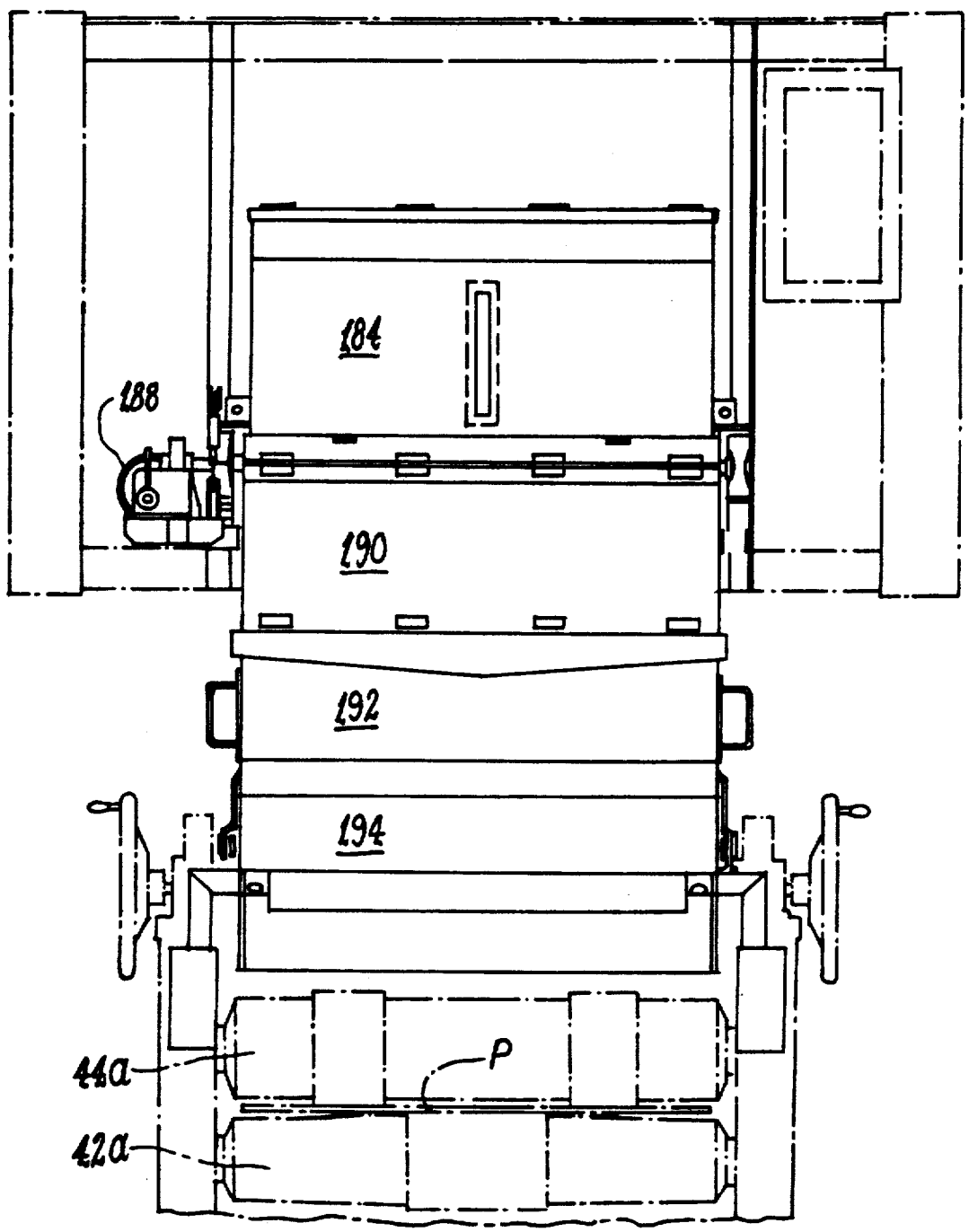
FIG. 19 is an elevation and part sectional view taken on line XIX—XIX of FIG. 3.

As shown in FIGS. 13 and 14, assembly 154 comprises a rectangular support frame 156 which carries a plurality of carbon brushes 158 each urged against the lower surface of plate P by a respective pneumatic cylinder 160. Electric cables 162 conduct the current from brushes 158 to busbar 164, from which it returns via busbar 166 to busbar 151. Flexible hoses 168 supply compressed air to cylinders 160 via manifold section 170 of frame 156; with section 170 receiving air from a suitable source.

Mounted between beams 122,124, there is a fume exhaust system 172. The latter is insulated by insulating panel 174, and comprises a box-like exhaust canopy 176 having an exhaust inlet 178 above trough 74, via which fume is extracted from above trough 74, under the action of exhaust fan 180, for discharge from installation S.

On the runout side of exhaust system 172, the abovementioned flux supply assembly 68 extends above, and along the full length of, trough 74. Assembly 68 includes a flux hopper 184, from which flux is able to discharge along the length of wide-roll feeder 186 rotatable by motor 188. Below feeder 186, a metered flow of flux passes to feeder chute 190, and from the latter successively to top and bottom delivery chutes 192,194. A metered flow of flux is able to be charged to trough 74, as required, to maintain the necessary flux pool in trough 74.

Mounted on the runout side of plate feeder arrangement 39, there is provided a shield assembly 196. The latter extends along part of the length of table runout section R, above plate, to control slag release from the clad surface of plate P.

The electroslag surfacing machine 10 constitutes a facility for cladding the upper surface of flat steel plate P with a relatively thick layer of wear and/or corrosion resistant material. A unique characteristic is the at least semi-continuous full plate width surfacing of wide plate from 300 mm up to 1000 mm or more in the horizontal position in a single pass.

An electroslag pool (resistive heated by current flow between non-consumable graphite electrodes 66 and the plate P) is locally contained in a water-cooled mould 74 on the surface of the moving plate P.

The plate P, which preferably is precoated with the metered and consolidated mixture of alloy powders required to achieve the desired overlay chemical composition, is fed via entry-side feed rollers 42,44 through a clamping roll 102, over a water-cooled hearth block 110, so that the underside of the plate P, opposite the mould position, is cooled during the melting operation on the top surface. Melting of the alloy powder mixture is achieved by thermal energy transfer from the slag pool (typically at a temperature of the order of about 1600° C.) to the alloy powder layer and to the upperside of the plate.

The clad plate P exits the mould 74 under a quench bar of the latter which serves to solidify a thin layer of slag over the surface of the cladding, prior to the plate entering the power driven rollers 42a, 44a at the runout end. Make-up flux is supplied to replenish the slag pool as required.

The machine frame supports the head of the machine consisting of the bank of graphite electrodes 66 (number, size and spacing determined by operating conditions) arranged vertically and spaced across the width of the plate P. The head comprises individual stepping-motor driven vertical slides to automatically control the electrode working distances above the plate surface. Following a start-up sequence to establish the full plate-idth slag pool, the electrodes are regulated by a computer-controlled closed-loop system that monitors and automatically adjusts the current supplied through each electrode to preset running conditions.

The hearth block arrangement described above can result in too much heat being extracted from the lower surface of plate P. This can occur, for example, when plate P is relatively thin or where a relatively thick cladding layer is to be provided on plate P. An alternative hearth block arrangement therefore is illustrated schematically in FIGS. 22 and 23. A variant of that alternative is shown in FIGS. 24 and 25. In each case, parts corresponding to those of the apparatus of FIGS. 20 and 21 have the same reference numeral, plus 100.

In the arrangement of FIGS. 22 and 23, the hearth blocks 210 are mounted in support frame 208, although blocks 210 are spaced from the lower surface of plate P so as to define an air-space 207 therebetween. At the downstream side of hearth block assembly 204 in the feed direction for plate P, there is provided a layer 209 of graphite. Layer 209 is supported on blocks 210 and bears against the lower surface of plate P.

The thickness of layer 209 between blocks 210 and plate P, and its width in the feed direction for plate P, is chosen so as to achieve a suitable degree of cooling for a given plate P and a given thickness of cladding layer to be formed thereon. If the area of contact between layer 209 and plate P was too large, too much heat is removed from the plate and melting of the precoated layer of alloy powder is impaired. If the area of contact was too small, too little heat is removed from the plate and the plate cools at too slow a rate, leading to an undesirable microstructure in the cladding of the final product. A thickness of about 10 mm, and a width in the feed direction of about 30 mm, for layer 209 has been found to be useful in many instances. The length of layer 209 laterally of the feed direction is such that it extends at least across the full width of plate P. Layer 209 can be of a continuous length, or provided by a series of blocks, as shown, each supported by a respective hearth block 210.

In use of the arrangement of FIGS. 22 and 23, as distinct from that of FIGS. 20 and 21 in which blocks 110 directly contact plate P, a modification of the start-up procedure is desirable. This is because the area of plate P directly below electrodes 66 is not in contact with a cooling medium. In that modified start-up, a strip of metal, such as about 3 mm thick, is welded across the top surface of the leading end of plate P. The electrodes are lowered to contact the strip, rather than plate P directly, during start-up; the strip reducing the risk of burn-through occurring.

In use of the invention, heat input needs to be balanced by the heat output into the plate and the cooling systems provided in the flux mould arrangement and by the hearth block arrangement. Variation in depth of the molten slag pool can vary the heat lost to the cooling systems, and plate speed can vary the heat lost to and from the plate. A selected combination of heat input and plate speed can produce good electroslag operating conditions. However, a change in another parameter can occur, resulting in a loss of heat input/output balance and the need for corrective action. It therefore is desirable to monitor under-plate temperature to give an operator an immediate indication of heat balance, and to enable corrective action. Obviously, if that temperature steadily rises too much, the heat input is excessive and either plate speed should be increased or power input decreased. Conversely, if the temperature steadily falls too much, either plate speed should be decreased or power input increased. It is desirable that the plate temperature should vary, within limits, about some mean value, and be dependent only on local conditions such as flux additions.

In the arrangement of FIGS. 24 and 25, hearth blocks 210 are omitted. Layer 209 of graphite is retained by a baffle 211 which extends across and is mounted on frame 208 to define air space 207. Thus, cooling essentially is provided only by layer 209 and frame 208, although frame 208 can define a passage therearound for circulation of cooling water, if required. In baffle 211, there is a series of ports 211a spaced laterally with respect to the feed direction of plate P. A temperature sensor, such as a radiation pyrometer, can be provided at at least one of ports 211a, to measure the temperature of the under-surface of plate P.

If cooling of the under-surface of plate P is insufficient in the arrangement of FIGS. 24 and 25, due to the absence of blocks 210, such blocks can be provided. The blocks 210 could be movable to permit periodic insertion of at least one temperature sensor, or at least one temperature sensor could be incorporated in the blocks 210 in line with respective ports 211a. Also, of course, at least one temperature sensor could be incorporated in the hearth block assembly shown in FIGS. 20 and 21.

The output of the or each temperature sensor enables the operator to determine whether the cladding conditions are correct or not, obviating the need to rely on experience gained from previous runs. The under-plate temperature measurement allows the operator to determine the conditions at the time of cladding, if desirable with temperature being recorded with time. Both the heat balance, the variation of temperature with time, and temperature gradients across the plate can be measured, and action taken to bring these within preset limits.

Some form of oxidation protection for the under-surface of plate P is desirable to prevent excessive oxide build-up, delamination of oxide, and resultant variations in measured temperture. Viewing the under-surface of plate P through ports 211a of baffle 211 is one means of achieving such protection, as baffle 211 allows only limited ingress of oxygen to air space 207. The readings of under-surface temperature can be used to make adjustments to the operation in accordance with the invention, either manually or through a feed-back loop.

In use of the invention, start up conditions can be such that a molten slag pool is formed at one end of flux trough 74 before the flux is fully molten at the other end. If this occurs, the one end receives more power and becomes hotter. There is little tendency for lateral mixing of flux in the pool, and a resultant temperature gradient can remain for a considerable time as uniform power input will not rectify this. Instead, more power should be applied to the lower temperature end to equalize temperature along trough 74.

Our special case, involving such temperature gradient, tends to occur with the two end electrodes, i.e. the two laterally outermost electrodes with respect to the feed direction. Those end electrodes have a larger volume of flux to heat, plus greater heat loss through the end walls of trough 74. Unless this tendency is offset, edges of the plate can run cold and then will not be clad properly. One solution is to increase the power input to each end electrode, relative to the other electrodes, although this complicates power control requirements and electrode power supply. A preferred solution is to reduce heat loss by the slag pool to the end walls of trough 74 by insulating those end walls. It has been found that one or two layers of graphite, provided against those end walls to a total thickness of about 10 mm, is suitable for this purpose.

GENERAL DESCRIPTION

The product is in the form of clad light-weight plate, 300–1000 mm wide with the combined overlay-substrate thickness in the range 6 mm to 22 mm. The clad plate consists of a weldable and relatively tough steel substrate with a very uniform layer of cladding on one side, which constitutes 20–50% of the thickness depending on the product requirements. The cladding is melted and fused onto the plate by the electroslag surfacing process, which yields a continuous, seam-free overlay across the full width of the plate. The composition of the surface layer may be varied to produce inter -alia a hard wear resistant surface or a corrosion resistant surface. The composition of the surface layer is con rolled by the mixture of powders pre-bonded to the plate surface and the amount of the top surface of the base plate melted during the process.

The resultant clad plate product falls into two categories: Type 1 involves minimal base plate melting and may be associated with incomplete melting of the cladding, whereby a densely sintered cladding layer results which is tenaciously bonded to the plate surface; and Type 2 uses a low melting point powder mixture which melts over the surface to form a brazed layer without any base plate melting.

Specific Examples of Type 1 Product

1. High chromium white cast iron formed by melting a mixture of high carbon ferrochrome powder, iron powder and carbon on the surface with about 0.5–1 mm melting of the base plate. This forms a wear resistant layer of iron-chromium carbides in austenite.
2. A stainless steel overlay made by melting low carbon ferrochrome and iron powders on the surface, again with controlled base plate melting. This forms a corrosion and abrasion resistant stainless steel layer.

Specific Examples of Type 2 Product

1. Nickel or nickel-boron eutectic mixture is melted over the surface to form a corrosion resistant layer.
2. A mixture of nickel and chromium boride is melted to form a wear resistant surface layer containing NiCrB particles.
3. Tungsten carbide particles are bonded together using a low melting point alloy, such as NiB eutectic, to form a wear resistant surface layer.

General

The process involves moving a light-gauge flat steel plate P, padded with a mixture of alloy powders on its top surface, at a controlled rate under a molten, electrically-heated slag pool over the full width of the plate. The heat from the slag pool melts the powders, and when required, some of the steel plate to form a liquid layer over the surface of the plate which progressively solidifies across the full plate width as the plate moves out from under the slag pool.

Plate preparation

The powders required for the overlay are thoroughly mixed together, and then a binder such as a 10% solution PVA in water is added. Alternatively dry binders can be used. This slurry mixture is then spread over the surface of the steel plate and screeded to a prescribed thickness (typically 4 to 20 mm) using a straight edge running on edge strips of the required thickness as gauges. The padding with the water based binder must be dried at elevated temperature prior to use.

Melting

The melting procedure involves passing the padded plate under a molten slag pool, contained in a water-cooled mould, with a water-cooled hearth under the plate to prevent through-thickness melting of the plate. The volume of the slag pool for 600 mm wide plate is 640 mm $\times$ 100 mm $\times$ 25 mm minimum slag pool depth. The process is dependent upon the heat flow into the plate from the slag pool, which is controlled by the temperature of the slag pool, the speed of the movement of the plate under the slag pool and the heat lost by the plate to the water-cooled hearth. There must be sufficient energy to melt the powders on the surface and when required to melt a superficial layer of the plate surface, but the heat flow must be balanced to avoid excessive melting of the plate. In practice the heat lost to the hearth is essentially constant, dependent mainly upon the hearth design. The temperature of the slag pool is varied by the current passing through it, and the plate speed is controlled by the speed of the drive roller.

The plate must be driven at a suitable speed for the current selected and alloy powders used (i.e. a lower melting point mixture requires less energy).

Solidification

The liquid alloy on the plate surface is cooled by the plate passing between the quench bar incorporated in the water-cooled exit side of the mould and a cooling element incorporated in the exit side of the hearth. The principal chilling occurs in the heat extraction from the underside of the plate.

Sealing of slag pool and slag loss

The quench bar also retains the slag in the slag pool, as a small gap (nominally 1 mm) exists between the underside of the mould and the overlay surface. A layer of liquid slag enters this gap to be chilled and solidified on the plate surface and exits from under the mould with the plate. Make-up flux from a flux feeder replenishes the molten slag pool. This process not only acts as a seal between the plate and the mould but the continual loss of slag and replenishment with new flux helps keep the slag composition constant, as the slag is broken down by the passage of the electric current through it.

Control of Slag Pool Temperature

The slag pool typically consists of a pool of molten oxides and fluorides, which at temperature is electrically conductive. Graphite electrodes dip into the slag pool carrying current, which heats the molten slag on passing through it by resistive or Joule heating. The heat generated depends upon the current flowing and the voltage between the bottom of the electrode (the anode) and the plate surface (the cathode). These parameters are monitored and controlled by a computer system, which also has control over the output of the power supplies. Once the slag pool is molten the system is a closed loop with the computer controlling the electrode height or distance from the base plate via the stepping motor drives, to maintain constant current in each electrode. This individual control is required as some electrodes may burn down more quickly than others.

The basic sequence of the control system is that the computer sets the required preselected power from the DC power supplies. The electrodes move up or down to obtain a preset voltage between the bus-bar and the base plate with all the electrodes connected to a particular power supply moving simultaneously. Each individual electrode position is varied to equilibrate the current in each electrode.

This process varies the voltage measured as the load on the system changes so that all the electrodes are repositioned to give the preset voltage. This sequence of voltage adjust and current equalization continues throughout the complete run to maintain a constant heat source for the melting operation.

The Start-up procedure

The process has been designed to start with powdered flux, using only the graphite electrodes to melt the flux and form a molten slag pool. The sequence has been set up under computer control and involves initial arcing, and then electroslag operation under each electrode.

System Construction

The controller for the machine is based on two microcomputers, one called the Remote Data Unit (RDU) and the other the Main Control Computer (MCC). The RDU connects to current and voltage sensors, stepping motor drives, electrode position limit switches, external relays, operator pushbuttons and welding power supply controllers.

The MCC acts as a supervisor for the RDU and has interfaces to communicate with the RDU, display process data on a CRT screen, allow connection of a data terminal, accept commands from an in-built keypad and store data on floppy disk.

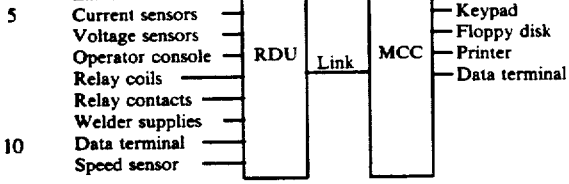

System Functions

The PROGRAM which runs in the RDU causes it to periodically take readings from each of the current and voltage sensors and the plate speed transducer. It then writes these values into its MEMORY and proceeds to examine the values of the currents to determine whether they are within the required limits for each electrode. If corrections are required, the RDU then activates the appropriate motors in the direction to bring the currents back to the desired conditions.

The values which have been stored in MEMORY are now transmitted to the MCC for processing. To do this, the RDU signals the MCC asking if it is ready to accept data. If it is, both computers run a section of their respective PROGRAMS which cause the data to be copied from the RDU MEMORY to the MCC MEMORY. If the MCC was not ready for data, the RDU holds the data in its own MEMORY and proceeds with its tasks. When the next set of data is sent to the MCC, the previously omitted date is also transmitted.

In the time intervals between data collections, the RDU checks to see if there are any commands sent from a connected data terminal or from the MCC. If there are, these are acted upon without altering the precise timing of data collection cycles. In other words, data collection and motor control form the FOREGROUND tasks in the RDU and command processing is the BACKGROUND task performed when the computer has time to do it. The computer runs so fast that the operator cannot notice any delay in command execution.

When the MCC receives data as described above, it copies it into its own MEMORY. It then processes the data, examining the values for anything untoward, displaying on the CRT screen and recording on the floppy disk for later display on the printer. If it detects that some action is required by the RDU, it can send a signal to the RDU telling it what is required. The extreme example of this is if the MCC detects that a major fault has occurred or is about to occur, in which case the MCC may tell the RDU to shut down the welders and withdraw the electrodes.

The CRT display generated by the MCC is designed to be of maximum assistance to an operator running the machine. Electrode currents are shown in the form of a histogram to enable instant assessment of the relative values. Welder voltages and supply currents are shown numerically as are both plate speed and distance travelled since the start of the run. Motor status is shown symbolically on the screen and a scrolling message window allows the MCC to notify the operator of any event requiring his attention.

Commencement

When power is turned on, each computer automatically runs a small PROGRAM set in a permanent READ-ONLY MEMORY (ROM). This program sets all necessary variables to the correct starting values and sets all the chips which interact with external devices to their default states. The processes then differ in the two computers.

In the MCC, the main operating PROGRAMS for both the MCC and the RDU are held in FILES on the floppy disk. The next task for the MCC is to load the OPERATING SYSTEM PROGRAM into MEMORY and execute it. This OPERATING SYSTEM forms the basic umbrella PROGRAM under which all computer operations are carried out. The process of getting it to MEMORY from disk and executing it is called SYSTEM BOOT and is carried out automatically at this stage.

With the OPERATING SYSTEM established, another automatic process is invoked which causes the PROGRAMS for both the MCC and the RDU to be transferred to MEMORY in the MCC. Execution then begins at the start of the MCC program. This causes the MCC to write the display framework on the CRT screen and to wait for instructions from the operator or the RDU.

The RDU meanwhile has been executing its own ROM program which causes it to look and see if the main program resides in memory at the instant. It will not find it there at power up because the MEMORY in which it sits is erased when the power is off. Since it cannot find the main program, the RDU next sends a signal to the MCC requesting it to transmit the main program to it. When it is ready (normally instantaneously) the MCC responds and both computers run sections of their PROGRAMS which cause the main program for the RDU to be copied from memory in the MCC to the proper place in the RDU. The veracity of this transmission is carefully checked at both ends and any errors are corrected automatically. When the RDU is satisfied with the program which is now in MEMORY, it starts execution at the start address and the machine is operational.

Before Running

There are two main modes of operation of the machine called STARTUP and RUN modes. STARTUP is the process which initiates the molten slag pool under the electrodes while RUN mode is the state where plate is being passed under the pool and being coated with a clad layer.

STARTUP is part of the main program in the RDU. It is called into action by a pushbuton on the operator console. The process is wholly controlled by the RDU and runs at extremely high speed to allow instantaneous reaction of the computer to machine conditions. Before STARTUP is initiated, the operator must install paper flux excluders on two electrodes called the SECONDARY starting electrodes. The STARTUP process begins with the power supplies being programed to low output levels by the RDU. The welder voltages are checked and the process aborted if they are below an acceptable level. All electrodes are then moved down at fast speed until they contact the plate. Contact is evidenced by current flow being detected in the individual electrodes and the motion of the respective electrode is stopped as soon as this condition is reached. All but two electrodes which are called the PRIMARY starting electrodes are then withdrawn a preset distance from the plate. Powdered flux is then fed into the mould enclosure for a set time, with the flux excluders preventing entry of flux to the area immediately below the secondary starting electrodes.

The primary starting electrodes are then raised slowly from the plate until their respective currents fall below an upper threshold level. During this interval, arcing occurs briefly which quickly melts the flux under the electrodes causing them to conduct in electroslag mode. After a time delay to allow molten pools to establish under the primary starting electrodes, input power is increased and the secondary starting electrodes are driven down to contact the plate. These are then withdrawn under the same conditions as the primary starting electrodes. The paper flux excluders burn away rapidly when the arcs are present and molten pools form under the secondary as well as the primary starting electrodes. As these small pools spread to other electrodes the computer senses their extent and increases power inputs accordingly until the full pool is established. Current levels are maintained between upper and lower limits for all conducting electrodes by electrode movement.

When all electrodes are conducting through the pool, the RDU signals the operator and the MCC so that the decision to switch over to RUN mode may be made by the operator when ready. The STARTUP process may be aborted at any time by the operator or it may be aborted by the RDU itself if it finds a dangerous situation developing.

In RUN mode, plate is driven through the machine and the RDU monitors the process and controls motors to maintain preset conditions. The MCC receives process data, displays it to the operator and records process variables on floppy disk.

Design Considerations

The use of two computers ensures that accurately spaced data collection and disk storage can occur simultaneously. It also provides the opportunity for cross checking of operation and operator alert if one of the computers fails.

At any time after a run is complete, a paper copy of all data associated with that run may be obtained from a printer connected to the MCC. This may be in the form of graphs of variables with time or distance, or it may be requested as a numeric record of the variables with time. This will be useful for process fault diagnosis and could easily be used as a permanent quality control record.

Finally, it is to be understood that various alterations, modifications and/or additions may be introduced into the construction and arrangements of parts previously described without departing from the spirit or ambit of the invention.

We claim:

1. Apparatus for electroslag surfacing of metal plate, the apparatus comprising a plate feeder assembly along which metal plate to be surfaced is conveyed during an electroslag cladding operation, the plate feeder assembly including an elongate, horizontally disposed feeder table having an approach-end section and a runout-end section; and an electroslag surfacing installation operable to clad an upper surface of the metal plate as it is conveyed along the plate feeder table, the surfacing installation being located intermediate said sections; the plate feeder assembly having conveying means, spaced along the feeder table, on which the metal plate is conveyed in a feeding direction from the approach-end section to, and beyond, the surfacing installation so as to discharge from the surfacing installation along the runout section; the surfacing installation including a flux mould arrangement positioned to contain molten flux during a cladding operation so that a sufficient depth of flux is maintained on said upper surface for efficient electroslag cladding; the surfacing installation further including an electrode holder and feeder assembly which is spaced over the plate feeder assembly, above the mould arrangement, and which extends laterally of the plate feeder assembly relative to said feeding direction; the electrode holder and feeder assembly being adapted to hold electrode means and being connectable to a power source for the supply of electric power to said electrode means for an electroslag operation, the electrode holder and feeder assembly being operable to adjust said electrode means vertically; the apparatus being such that, as metal plate to be surfaced by a cladding operation is conveyed along the plate feeder assembly in said feeding direction, the electrode holder and feeder assembly is operable:

to lower the electrode means into the mold arrangement to bring a lower end of the electrode means into contact with said upper surface of the metal plate and establish current flow therebetween, then to raise the electrode means to an operating height to initiate conditions providing an arc between said lower end and upper surface, and with establishment of a molten slag pool in said mould arrangement which submerges said arc, to retain said lower end of the electrode means at a spacing from the upper surface sufficient to maintain said arc and efficient electroslag operation.

2. Apparatus according to claim 1, wherein the feeder table comprises a horizontally disposed frame structure supported on a base.

3. Apparatus according to claim 2, wherein said frame structure has elongate side members extending in said feed direction and secured in laterally spaced relation by transverse connecting members.

4. Apparatus according claim 1, wherein said conveying means consists of a series of conveyor rollers which are rotatable on axes extending transversely with respect to the feed direction, the rollers of the series being spaced from each other in said feed direction.

5. Apparatus according to claim 3, wherein said conveying means consists of a series of conveyor rollers which are rotatable on axes extending transversely with respect to the feed direction, the rollers of the series being spaced from each other in said direction, each roller having its ends journalled in a respective bearing block adjacent a respective said elongate side member.

6. Apparatus according to claim 4, wherein said plate feeder assembly has drive means by which the metal plate is moved along the conveying means in said feed direction.

7. Apparatus according to claim 4, wherein said plate feeder assembly has drive means by which the metal plate is moved along the conveying means in said feed direction, at least one of said conveyor rollers forming part of said drive means and being rotatable under the action of a drive motor of said drive means.

8. Apparatus according to claim 7, further including biasing means operable to bear on the upper surface of the metal plate to maintain said plate in driving engagement with said at least one conveyor roller.

9. Apparatus according to claim 6, wherein the drive means includes a transverse pair of vertically spaced feed rollers between which the plate passes in said feed direction and a drive motor operable to drive at least one of the rollers of said pair.

10. Apparatus according to claim 9, wherein said pair of feed rollers comprises a lower feed roller having each of its ends journalled in a respective one of bearings located at each side of the feeder table, and an upper feed roller having each of its ends located in, and adjustable along, a respective slide, the upper roller being vertically adjustable in said slides to enable variation in clamping pressure exerted by the feed rollers on said metal plate.

11. Apparatus according to claim 10, wherein said upper roller has a sleeve provided over its external surface, said sleeve being of resilient material.

12. Apparatus according claim 9, wherein said drive motor is coupled to and operable to drive said lower roller.

13. Apparatus according to claim 6, wherein there is a respective drive means at each of the approach-end section and the runout-end section of the feeder table such that the metal plate is fed positively to the surfacing installation for cladding and clad plate is fed positively away from said installation, each said drive means including a transverse pair of vertically spaced feed rollers between which the plate passes in said feed direction and a drive motor operable to drive at least one of the rollers of said pair.

14. Apparatus according to claim 13, wherein said pair of feed rollers of each said drive means comprises a lower feed roller having each of its ends journalled in a respective one of bearings located at each side of the feeder table, and an upper feed roller having each of its ends located in, and adjustable along, a respective slide, the upper roller being vertically adjustable in said slides to enable variation in clamping pressure exerted by the feed rollers on said metal plate.

15. Apparatus according to claim 14, wherein the upper roller of the drive means at the runout-end section of the feeder table is mounted so as to be able to float vertically through a distance sufficient to accommodate undulations in the metal plate caused by the electroslag operation.

16. Apparatus according to claim 15, further including hydraulic actuation means operable to permit said upper roller to float vertically.

17. Apparatus according to claim 1, further including at least one centering means operable to engage side edges of the metal plate and to constrain the plate against lateral movement as it is conveyed in said feeding direction.

18. Apparatus according to claim 17, wherein said at least one centering means is laterally adjustable to accommodate metal plate of different widths.

19. Apparatus according to claim 18, wherein said at least one centering means includes a pair of blocks spaced laterally with respect to the feeding direction and between which the metal plate is conveyed, each block being screw-engaged with a respective end of a rod journalled in bearings mounted on the feeder table, the rod being rotatable to move said blocks laterally in unison and to adjust the spacing therebetween.

20. Apparatus according to claim 1, wherein said mould arrangement extends laterally with respect to the feeding direction across substantially the full operating width of the plate feeder table.

21. Apparatus according to claim 1, wherein said mould arrangement comprises a peripheral wall bounding a mould cavity which has an open top and bottom, at least a major portion of the bottom of the mould being substantially closed by the metal plate during a cladding operation so as to retain a molten slag pool therein.

22. Apparatus according to claim 21, further including a respective shoe adjacent each side of the plate feeder table, each shoe being located under a respective end portion of the mould arrangement for closing a region of the bottom of the mould at said end portion, each shoe being resiliently urged by biasing means so as to seal against a side edge of the metal plate.

23. Apparatus according to claim 21, wherein the peripheral wall comprising said mould arrangement defines a passage therearound, said peripheral wall being adapted for connection to a source of cooling water for circulation of cooling water through said passage.

24. Apparatus according to claim 1, wherein said electrode holder and feeder assembly is adapted to hold electrode means comprising a plurality of electrodes, such that said electrodes are in laterally spaced relationship across at least part of the lateral extent of the plate feeder assembly.

25. Apparatus according to claim 24, wherein said electrode holder and feeder assembly includes a header structure mounted above and extending transversely across the feeder table in vertically spaced relation thereto, and a respective electrode holder for each electrode, each electrode holder being mounted in relation to the header structure by a respective electrode feeder means operable to move its electrode holder vertically, relative to the header structure, towards and away from the feeder table.

26. Apparatus according to claim 25, wherein said header structure is supported above said feeder table by a respective column at each side of the feeder table.

27. Apparatus according to claim 25, wherein each electrode feeder means comprises an actuator which mounted between the header structure and the respective electrode holder and is operable to provide reversible linear drive by which its electrode holder is vertically movable.

28. Apparatus according to claim 27, wherein each said actuator comprises a reversible stepping motor.

29. Apparatus according to claim 28, wherein each motor has an output shaft coupled to a respective upwardly extending rod having a helical thread, with each electrode holder having a shaft parallel to the rod, a toothed bracket on the shaft meshing with the thread of rod such that, as the rod is rotated on actuation of its motor, the bracket, shaft and electrode holder is drawn along the rod.

30. Apparatus according to claim 1, wherein said electrode holder and feeder assembly includes at least one busbar by which it is connectable to a power source for supply of electric power to said electrode means, the at least one busbar being electrically connectable to the electrode means by cable means of a length accommodating operation of the electrode holder and feeder means to adjust said electrode means vertically.

31. Apparatus according to claim 25, wherein said electrode holder and feeder assembly includes at least one busbar by which it is connectable to a power source for a supply of electric power to said electrodes, the at least one busbar being electrically connected to the holder for each electrode by a respective cable for each holder, each cable being of a length accommodating vertical movement of its holder under the action of the respective electrode feeder means.

32. Apparatus according to claim 30, further including electrical contact brushes positioned on said plate feeder assembly for contacting the metal plate from below, said contact brushes providing part of a return path for current generated by said power source during electroslag operation.

33. Apparatus according to claim 1, wherein the surfacing installation further includes a hearth block arrangement mounted below the mould arrangement, the hearth block arrangement being positioned to engage the metal plate from below so as to maintain the metal plate in relation to the mould arrangement and to provide means for cooling the plate.

34. Apparatus according to claim 33, wherein the surfacing installation further includes clamping means operable to apply a downwards force on the upper surface of the metal plate, the clamping means cooperating with the hearth block arrangement to maintain the metal plate in relation to the flux mould arrangement.

35. Apparatus according to claim 34, wherein the clamping means is a freely rotatable clamping roll which extends laterally with respect to the feed direction, the clamping roll having each of its ends journalled in respective bearing such as in respective spring loaded bearing housing.

36. Apparatus according to claim 33, wherein the hearth block arrangement is secured between opposed sides of the plate feeder assembly, and is adapted for water cooling to enhance cooling of the plate from below.

37. Apparatus according to claim 33, wherein said hearth block arrangement is urged upwardly, so as to bear against the metal plate from below, under the action of urging means such as pneumatic or hydraulic cylinders.

38. Apparatus according to claim 37, wherein said hearth block arrangement comprises a plurality of cooling blocks arranged in series between opposed sides of the plate feeder assembly, said urging means being operable to urge each said cooling block such that each cooling block is individually urged upwardly.

39. Apparatus according to claim 1, further including a flux feeder arrangement located above, and adapted to supply flux to, the flux mould arrangement.

40. Apparatus according to claim 39, wherein said flux feeder arrangement is located adjacent the electrode holder and feeder arrangement, and is operable to supply flux to the flux mould arrangement over substantially the full lateral extent of the flux mould arrangement.

41. Apparatus according to claim 39, wherein the flux feeder arrangement has a flux feeder roll, a flux hopper on the intake side of the feeder roll for the supply of flux to the feeder roll, and a distribution chute for conducting flux received from the feeder roll into the flux mould arrangement.

42. Apparatus according to claim 1, further including a metal powder feeder arrangement located above, and adapted to supply metal powder to, the flux mould arrangement.

43. Apparatus according to claim 42, wherein the powder feeder arrangement is located adjacent the electrode holder and feeder arrangement, and is operable to supply powder to the flux mould arrangement over substantially the full lateral extent of the flux mould arrangement.

44. Apparatus according to claim 42, wherein the powder feeder arrangement has a powder feeder roll, a powder hopper on the intake side of the feeder roll for the supply of powder to the feeder roll, and a distribution chute for conducting powder received from the feeder roll into the flux mould arrangement.

45. Apparatus according to claim 1, further including control means operable to monitor or monitor and regulate each of the conveying of metal plate along said feeder table, electric power supplied to the electrode means by said power source and operation of said electrode holder and feeder assembly to adjust said electrode means vertically.

46. A method of electroslag surfacing of metal plate, said method comprising the steps of:
(a) presenting the plate to a plate feeder assembly including an elongate, horizontally disposed feeder table having an approach-end section and a runout-end section,
(b) conveying the plate, with a major surface thereof uppermost, along said feeder table in a feeding direction from said approach-end section to said runout-end section, and
(c) subjecting said plate to an electroslag operation at a surfacing installation located intermediate said sections of the feeder table to provide a cladding metal layer on said uppermost surface, said operation comprising:
 (i) passing the metal plate, at said surfacing installation, under a flux mould arrangement and under an electrode holder and feeder assembly having depending electrode means vertically in line with the interior of the mould arrangement;
 (ii) operating said electrode holder and feeder assembly to lower the electrode means into the mould arrangement to bring a lower end of the electrode means into contact with said upper surface and to establish current flow between the electrode means and said metal plate, under the action of electric power supplied to the electrode means by a power source in a circuit completed by said metal plate;
 (iii) operating said electrode holder and feeder assembly, on establishing said current flow, to raise the electrode means to an operating height to establish an arc between the lower end of the electrode means and said uppermost surface;
 (iv) on establishing said arc, charging flux to mould arrangement and melting the flux therein to establish a molten slag pool which overlies said uppermost surface and submerges said arc; and
 (v) supplying metal alloy powder material to said mould arrangement, while said electrode holder and feeding arrangement is controlled to retain the lower end of the electrode means at a spacing from the uppermost surface to maintain said arc and efficient electroslag operation, said metal alloy material being provided at the interface between the slag pool and the uppermost surface and melted in said mould arrangement to clad said uppermost surface as the metal plate is conveyed under the mould arrangement.

47. A method according to claim 46, wherein said metal alloy material is provided as a metered and consolidated mixture of alloy powder precoated on said major surface prior to the metal plate being presented to the plate feeder assembly.

48. A method according to claim 46, wherein said plate is Conveyed along conveying means of said feeder table, and spaced therealong, under the action of drive means of said plate feeder assembly.

49. A method according to claim 48, wherein said plate is conveyed to said surfacing installation under the action of a first transverse pair of vertically spaced feed rollers located at said approach-end section of the plate feeder assembly, the plate being passed in said feed direction between said rollers under the action of a drive motor operating to drive at least one of the rollers of said first pair.

50. A method according to claim 49, wherein said plate is conveyed from said surfacing installation under the action of a second transverse pair of vertically spaced rollers located at said runout-end section of the plate feeder assembly, the plate being passed in the feed direction between said rollers of said second pair under the action of a drive motor operating to drive at least one of the rollers of said second pair.

51. A method according to claim 46, wherein said plate is constrained at side edges thereof against movement laterally with respect to said feed direction as it is conveyed along said feeder table.

52. A method according to claim 46, wherein said plate passes under said flux mould arrangement such that the upper surface of said plate substantially closes an open bottom of said flux mould arrangement and at least partially retains said molten slag pool in said flux mould arrangement.

53. A method according to claim 52, wherein a respective shoe adjacent each side of the plate feeder assembly is biased to seal against a side edge of the plate as the latter passes under the flux mould arrangement, the plate and said shoes together substantially fully closing said open bottom to retain said molten slag pool in said flux mould arrangement.

54. A method according to claim 52, wherein cooling water is circulated through a peripheral wall defining said flux mould arrangement.

55. A method according to claim 46, wherein said electrode means comprises a plurality of elongate electrodes, each of said electrodes being held by a respective electrode holder having an associated respective electrode feeder means, said electrodes being disposed vertically in an array spaced laterally with respect to said feed direction, each electrode feeder means being individually operated to bring the lower end of its electrode into contact with said metal plate to establish said current flow, to raise its electrode to said operating height to establish said arc, and to retain the lower end of its electrode at said spacing to maintain said arc.

56. A method according to claim 46, wherein said plate is maintained in relation to the bottom of said flux mould arrangement by means of a hearth block arrangement which bears against the plate from below, the hearth block arrangement providing cooling of the plate.

57. A method according to claim 56, wherein cooling water is circulated through said hearth block arrangement and regulates the extent of cooling of said plate.

58. A method according to claim 56, wherein said hearth block arrangement is urged upwardly so as to bear against the plate from below.

59. A method according to claim 46, wherein flux is supplied to said flux mould arrangement during said electroslag operation so as to maintain said molten slag pool.

60. A method according to claim 46, wherein the conveying of said plate along said feeder table, the supply of electric power to the electrode means and operation of the electrode holder and feeder assembly to adjust said electrode means vertically is monitored or monitored and regulated during said electroslag operation so as to maintain a required level of efficiency of said operation.

* * * * *

UNITED STATES PATENT AND TRADEMARK OFFICE
CERTIFICATE OF CORRECTION

PATENT NO. : 5,068,507

DATED : 26 November 1991

INVENTOR(S) : Ian R. Dick, Ian D. Henderson, Gordon L. Kimpton, David S. Wyatt

It is certified that error appears in the above-indentified patent and that said Letters Patent is hereby corrected as shown below:

Column 21, claim 27, line 42 add --is-- after the word "which".

Column 22, claim 35, line 29 delete "bearing" and insert --bearings--.

Column 22, claim 35, line 30 delete "housing" and insert --housings--.

Signed and Sealed this

Twelfth Day of July, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,068,507

DATED : 26 November 1991

INVENTOR(S) : Dick et al.

Page 1 of 8

It is certified that error appears in the above-identified patent and that said Letters Patent is hereby corrected as shown below:

Title page,
 item [73] Assignee delete "Sceentific" and insert --Scientific--.

Column 1, line 6 delete "-" should read --electroslag surfacing--.

Column 1, line 59 delete "an operating height to initiate" and insert --a height initiating--.

Column 1, line 63 insert --and extinguishes-- after the word "submerges".

Column 1, line 64 delete "a spacing from" after "at".

Column 1, line 64 insert --an operating height above-- after "at".

Column 1, line 65 delete "said arc and" after "maintain".

Column 1, line 66 delete "." after "operation".

Column 1, line 66 insert --by conduction in said slag pool.-- after the word "operation".

UNITED STATES PATENT AND TRADEMARK OFFICE
CERTIFICATE OF CORRECTION

PATENT NO. : 5,068,507

DATED : 26 November 1991

INVENTOR(S) : Dick et al.

It is certified that error appears in the above-identified patent and that said Letters Patent is hereby corrected as shown below:

Column 1, line 66 after the words "slag pool." insert the following:

The invention also provides a method comprising the steps of:

(a) presenting the plate to a plate feeder assembly including an elongate, horizontally disposed feeder table having an approach-end section and a runout-end section, (b) conveying the plate, with a major surface thereof uppermost, along said feeder table in a feeding direction from said approach-end section to said runout-end section, and (c) subjecting said plate to an electroslag operation at a surfacing installation located intermediate said sections of the feeder table to provide a cladding metal layer on said uppermost surface, said operation comprising:

(i) passing the metal plate, at said surfacing installation, under a flux mould arrangement and under an electrode holder and feeder assembly having depending electrode means vertically in line with the interior of the mould arrangement;

UNITED STATES PATENT AND TRADEMARK OFFICE
CERTIFICATE OF CORRECTION

PATENT NO. : 5,068,507
DATED : November 26, 1991
INVENTOR(S) : Dick, et. al.

It is certified that error appears in the above-indentified patent and that said Letters Patent is hereby corrected as shown below:

(ii) operating said electrode holder and feeder assembly to lower the electrode means into the mould arrangement to bring a lower end of the electrode means into contact with said upper surface and to establish current flow between the electrode means and said metal plate, under the action of electric power supplied to the electrode means by a power source in a circuit completed by said metal plate;

(iii) operating said electrode holder and feeder assembly, on establishing said current flow, to raise the electrode means to a height initiating an arc between the lower end of the electrode means and said uppermost surface;

(iv) on establishing said arc, charging flux to mould arrangement and melting the flux therein to establish a molten slag pool which overlies said uppermost surface and which submerges and extinguishes said arc; and (v) supplying metal alloy powder material to said mould arrangement, while said electrode holder and feeding arrangement is controlled to retain the lower end of the electrode means at an operating height above the uppermost surface to maintain said arc and efficient electroslag operation by conduction in said slag pool, said metal alloy material being provided at the interface between the slag pool and the uppermost surface and melted in said mould arrangement to clad said uppermost surface as the metal plate is conveyed under the mould arrangement.

UNITED STATES PATENT AND TRADEMARK OFFICE
CERTIFICATE OF CORRECTION

PATENT NO. : 5,068,507      Page 4 of 8

DATED : 26 November 1991

INVENTOR(S) : Dick, et al.

It is certified that error appears in the above-identified patent and that said Letters Patent is hereby corrected as shown below:

Column 3, line 37 insert --the-- after the word "of".

Column 3, line 40 insert --at the-- after the word "open".

Column 4, line 4 insert --and extinguish-- after the word "submerge".

Column 4, line 48 insert --the-- after the word "of".

Column 4, line 59 delete "approach end" and insert --approach-end--.

Column 5, line 57 insert --the-- after the word "that".

Column 7, line 43 delete "minimises" and insert --minimizes--.

Column 8, line 12 insert --,-- after the word "(not shown)".

Column 8, line 43 insert --at the-- after the word "open".

Column 8, line 56 delete "localised" and insert --localized--.

Column 9, line 4 delete "stabilised" and insert --stabilized".

Column 9, line 38 delete "116" and insert --115--.

Continued...

UNITED STATES PATENT AND TRADEMARK OFFICE
CERTIFICATE OF CORRECTION

PATENT NO. : 5,068,507

DATED : 26 November 1991

INVENTOR(S) : Dick et al.

It is certified that error appears in the above-identified patent and that said Letters Patent is hereby corrected as shown below:

Column 9, line 60 delete "132" and insert --130--.

Column 11, line 4 delete "runout end" and insert --runout-end--.

Column 11, line 15 delete "idth" and insert --width--.

Column 12, line 35-37, delete "The blocks 210 could be movable to permit periodic insertion of at least one temperature sensor, or" after the word "provided".

Column 12, line 37, delete "at" and insert --At--.

Column 13, line 20 delete "10" and insert --20--.

Column 13, line 34, delete "inter-alia" and insert --inter alia--.

Column 13, line 36 delete "con rolled" and insert --controlled--.

Column 15, line 68 delete "store" and insert --stored--

Column 16, line 12 insert --Chart 1 Pictorial Diagram of System-- below the chart before System Functions.

Column 16, line 63 insert --,-- after the word "voltages".

Column 16, line 65 delete "Motor status is shown symbolically on the screen and" after the word "run".

UNITED STATES PATENT AND TRADEMARK OFFICE
CERTIFICATE OF CORRECTION

PATENT NO. : 5,068,507

DATED : 26 November 1991

INVENTOR(S) : Dick et al.

It is certified that error appears in the above-identified patent and that said Letters Patent is hereby corrected as shown below:

Column 16, line 66 delete "a" and insert --A--.

Column 17, line 24 delete "This causes the MCC, to write" after the word "program." and insert --The MCC causes a menu to be drawn on the screen which allows the operator to select from a range of currents. When the selection is made by way of the key-pad, the data disc is checked and a file opened if appropriate. The MCC then writes--.

Column 17, line 26 delete "to wait" and insert --and waits--.

Column 17, line 50 insert --the-- after the word "where".

Column 18, line 32, insert --the-- after the word "mode".

Column 19, line 29 delete "initiate" and insert --initiating--.

Column 19, line 32, insert --and extinguishes-- after the word "submerges".

Column 19, lines 33, 34, 35 delete "a, spacing from the upper surface sufficient to maintain said arc and efficient electroslag operation." after the word "at" and insert --an operating height above the upper surface sufficient to maintain efficient electroslag operation by conduction in said slag pool.--

UNITED STATES PATENT AND TRADEMARK OFFICE
CERTIFICATE OF CORRECTION

PATENT NO. : 5,068,507

DATED : 26 November 1991

INVENTOR(S) : Dick et al.

It is certified that error appears in the above-identified patent and that said Letters Patent is hereby corrected as shown below:

Column 19, line 55 delete "4" and insert --1--.

Column 23, line 49 delete "to establish" and insert --initiating--.

Column 23, line 54 delete "and submerges" and insert --and which submerges and extinguishes--.

Column 23, line 58 & 59 delete "a spacing from" after the word "at" and insert --an operating height above--.

Column 23, line 59 & 60 delete "said arc and" after the word "maintain".

Column 23, line 60 insert --by conduction in said slag pool,-- after the word "operation".

Column 24, line 4, delete "Conveyed" and insert --conveyed--.

Column 24, line 54 delete "arc" and insert --electroslag operation--.

UNITED STATES PATENT AND TRADEMARK OFFICE
CERTIFICATE OF CORRECTION

PATENT NO. : 5,068,507

DATED : November 26, 1991

INVENTOR(S) : Ian R. Dick, et. al.

It is certified that error appears in the above-indentified patent and that said Letters Patent is hereby corrected as shown below:

Column 21, claim 27, line 42, add --is-- after the word "which".

Column 22, claim 35, line 29, delete "bearing" and insert --bearings--.

Column 22, claim 35, line 30, delete "housing" and insert --housings--.

Signed and Sealed this

Eleventh Day of October, 1994

Attest:

BRUCE LEHMAN

Attesting Officer

Commissioner of Patents and Trademarks